US009031982B2

(12) United States Patent
Martino et al.

(10) Patent No.: US 9,031,982 B2
(45) Date of Patent: May 12, 2015

(54) MULTI-CHANNEL CONTENT MODELING SYSTEM

(75) Inventors: Laura Martino, Rome (IT); Domenico De Luca, Rome (IT); Roberto Privitera, Rome (IT)

(73) Assignee: Accenture Global Services Limited (IE)

( * ) Notice: Subject to any disclaimer, the term of this patent is extended or adjusted under 35 U.S.C. 154(b) by 926 days.

(21) Appl. No.: 12/196,910

(22) Filed: Aug. 22, 2008

(65) Prior Publication Data

US 2009/0204603 A1 Aug. 13, 2009

(30) Foreign Application Priority Data

Feb. 11, 2008 (EP) .................................... 08425080
Jul. 1, 2008 (EP) .................................... 08425462

(51) Int. Cl.
*G06F 7/00* (2006.01)
*G06Q 50/10* (2012.01)

(52) U.S. Cl.
CPC .................................... *G06Q 50/10* (2013.01)

(58) Field of Classification Search
None
See application file for complete search history.

(56) References Cited

U.S. PATENT DOCUMENTS 5,987,480 A * 11/1999 Donohue et al. .............. 715/207
5,991,735 A * 11/1999 Gerace ......................... 705/7.33
6,128,663 A * 10/2000 Thomas ........................ 709/228
6,167,441 A * 12/2000 Himmel ........................ 709/217
6,345,279 B1 * 2/2002 Li et al. ................................ 1/1
6,470,378 B1 * 10/2002 Tracton et al. ................ 709/203
6,892,226 B1 * 5/2005 Tso et al. ...................... 709/218
7,356,575 B1 * 4/2008 Shapiro ......................... 709/220
7,551,913 B1 * 6/2009 Chien ........................... 455/411
2004/0203854 A1 10/2004 Nowak
2004/0249902 A1 * 12/2004 Tadayon et al. ............... 709/207
2005/0235047 A1 * 10/2005 Li et al. ......................... 709/219
2006/0074754 A1 * 4/2006 Toyohara et al. ............... 705/14
2006/0242269 A1 * 10/2006 Gross ............................ 709/219
2008/0182508 A1 * 7/2008 Khedouri et al. ............ 455/3.06

OTHER PUBLICATIONS

Annotation by Transformation for the Automatic Generation of Content Customization Metadata Hori et al. 2002.*
Adapting Multimedia Internet Content for Universal Access Mohan et al. Mar. 1999.*

* cited by examiner

*Primary Examiner* — Khanh Pham
*Assistant Examiner* — Bruce Witzenburg
(74) *Attorney, Agent, or Firm* — Brinks Gilson & Lione

(57) ABSTRACT

A service delivery platform receives a request for a catalogue. The system obtains subscriber-specific multi-media catalogue entries based on profile information stored with the service delivery platform. The system sends the subscriber-specific catalogue entries along with service details of the subscription back to the subscriber.

17 Claims, 39 Drawing Sheets

400

2100

MULTI-CHANNEL CONTENT MODELING SYSTEM

BACKGROUND OF THE INVENTION

1. Technical Field

This disclosure relates to the communication of targeted content information, and in particular relates to the relaying of available subscriber-specific and/or device-specific multimedia content to a subscriber.

2. Related Art

The proliferation of digital content has been unrelenting and ever increasing. Driven by strong consumer demand, digital music players, cellular phones, personal data assistants, personal computers, and other devices routinely provide access to staggering amounts of information. The information spans virtually every part of life, from telephone numbers, to personal contacts, to home videos, to personal music collections, to name just a few. One revealing indicator of the extent to which we rely on digital data is the size of common hard disk drives. While at one time an 80 MB hard drive seemed excessive, today individual disk drives available for personal computers offer multiple Terabytes of storage, and there is no sign that drive capacity growth will stop.

SUMMARY

A multi-channel content modeling system on a service delivery platform receives a request for a catalogue. The system retrieves profile information and obtains subscriber-specific catalogue entries based on the profile information. The system sends the subscriber-specific catalogue entries along with service details of the subscription back to the subscriber.

By implementing a multi-channel content modeling service, a user may be relieved from the task of content catalogue management in order to more easily retrieve data from a large amount of possibly distributed data storage devices and/or services. In this way, man-machine interaction is improved. In particular, the system and method may deal with user-specific requests regarding requested data and/or information as well as a user's device capacities (e.g. storage and/or processing capacities). Beyond it may be ensured that only authorized and/or subscribed users may access corresponding information and/or data.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENTS

Figure 1:
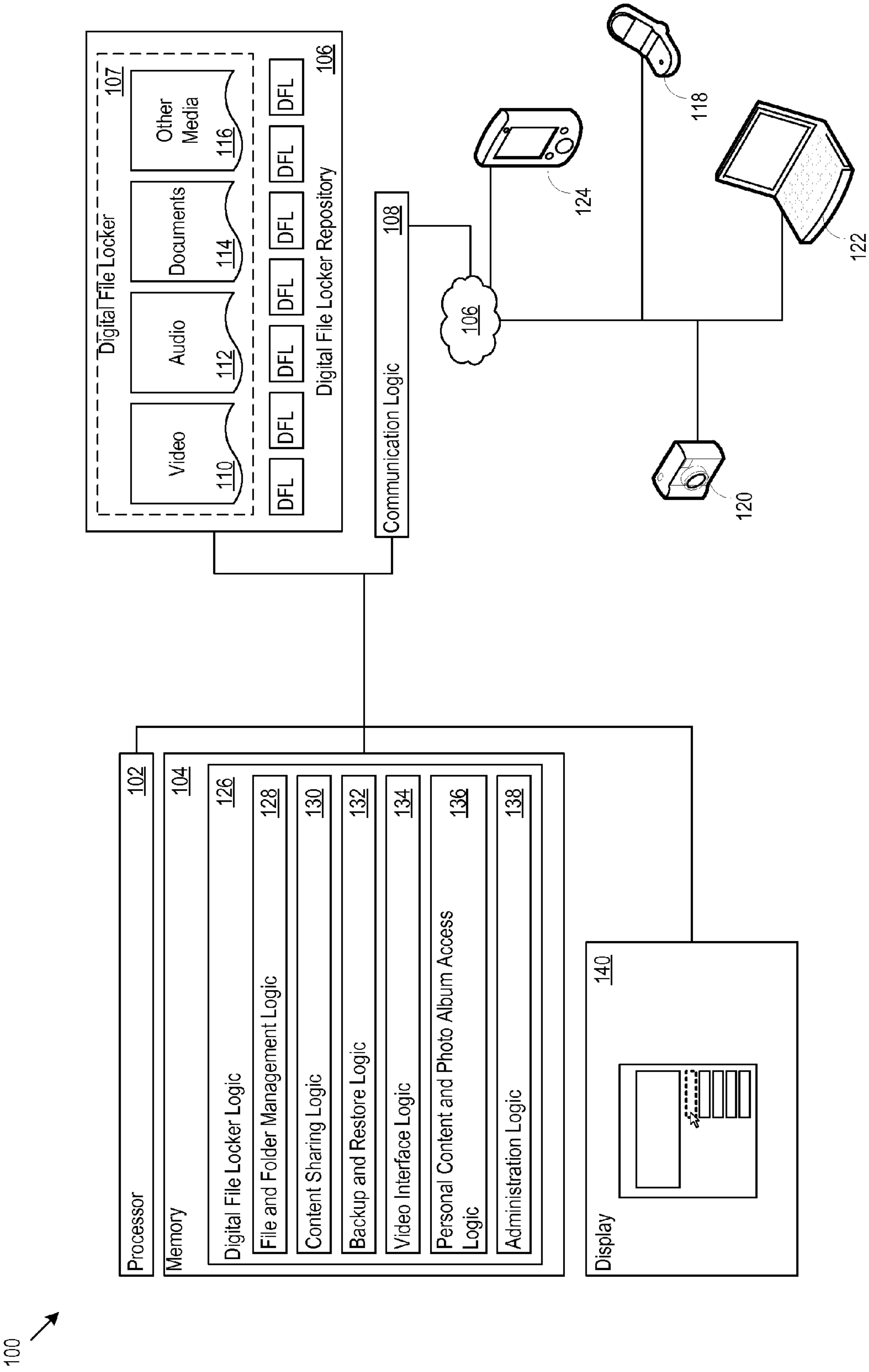
FIG. 1 shows a digital file locker system.

FIG. 1 shows a digital file locker system ("system 100"). The system 100 includes a processor 102, a memory 104, and a digital file locker repository ("repository") 106. The repository 106 stores digital file lockers (DFLs) 107 that hold subscriber digital content for a particular subscriber. There may be any number of DFLs for any number of subscribers in the repository 106. The system 100 may be implemented in many different ways, including as shown in FIG. 1, as shown in the hardware platform diagrams in FIGS. 8, 12, 15, 18, 20, 24, and 28, or in other ways. The system 100 exchanges information with other systems through the communication logic 108. The communication logic 108 may be a wireline/wireless interface, interprocess communication mechanism, shared memory, Web Services interface, or any other type of communication interface.

The repository 106 provides a centralized digital content repository that stores subscriber digital content uploaded by a subscriber. As examples, the subscriber digital content may include video data 110, audio data 112, document data 114, or any other type of data 116 uploaded by the subscriber. The repository thereby provides a central point of access for any number of subscribers to their own digital content, eliminating the need to store such content locally. The digital content is therefore available to the subscriber wherever the subscriber is located.

The subscribers may vary widely in form. One example shown in FIG. 1 is the cellular phone 118. Other examples include the digital camera 120, laptop computer 122, and the personal data assistant 124.

The memory stores digital file locker ("DFL") logic 126. The DFL logic 126 may include file and folder management logic 128, content sharing logic 130, and backup and restore logic 132. The DFL logic 126 may also include video interface logic 134, photo album access logic 136, and subscription logic 138.

The DFL logic 116 provides flexible access to the subscriber digital content. As an example, system 100 may receive a digital content manipulation command from the subscriber. The video interface logic 134 may then determine that the digital content manipulation command includes a video content access command, retrieve a video content catalogue of video content within the subscriber digital content in response to the video content access command, and deliver the video content catalogue to the subscriber. The video interface logic 134 may also accept a video action selection request from the subscriber in response to the delivering the video content catalogue to the subscriber, and determine the type of video action selection request. When the video action selection request is a video playback request, the video interface logic 134 may determine a resource locator for the video content selection request and deliver the resource locator to the subscriber. When the video action selection request is a video record request, the video interface logic 134 may accept a video stream from the subscriber and store the video stream in the digital content repository 106 as part of the subscriber digital content.

As another example, the content sharing logic 130 may determine that the digital content manipulation command includes a digital content shared property command specifying a shared user and first selected shared content within the digital content. The content sharing logic 130 may then set a shared content property for the shared user on the first selected digital content according to the shared property command, and send a shared property notification to a message communication system for automated delivery to the shared user. The content sharing logic may be further adapted to generate a shared user list comprising shared user identifiers and accept a subscriber selection from the shared user identifiers of a selected shared user identifier corresponding to the shared user. The content sharing logic may further determine that the digital content manipulation command includes a content forward command for second selected shared content within the digital content, accept a subscriber selection of a delivery type that distinguishes between an email attachment and a multimedia messaging service message, accept a subscriber selection of a delivery mode that distinguishes between email delivery and cellular phone delivery, accept a subscriber selection of a content recipient, and communicate the second selected shared content to the content recipient according to the delivery type and the delivery mode.

The file and folder management logic 128 provides flexible control over files and folders within the subscriber digital content. The backup and restore logic 132 provides the subscriber with the ability to save and retrieve selected portions of their uploaded content. The photo album access logic 136 may provide access to and manipulation of organizations of images stored in the subscriber digital content. The administration logic 138 may implement organizational access and control over the subscriber digital content, such as setting disk space quotas, access time restrictions, and other administrative settings for the subscriber digital content.

The display 140 provides for local or remote display showing the operation of the system 100. The subscribers 118 - 124 may also generate displays as they interact with the system 100. The system 100 may generate a wide variety of interfaces as described in more detail below, and interact with the subscribers 118-124 through the interfaces.

Figure 2:
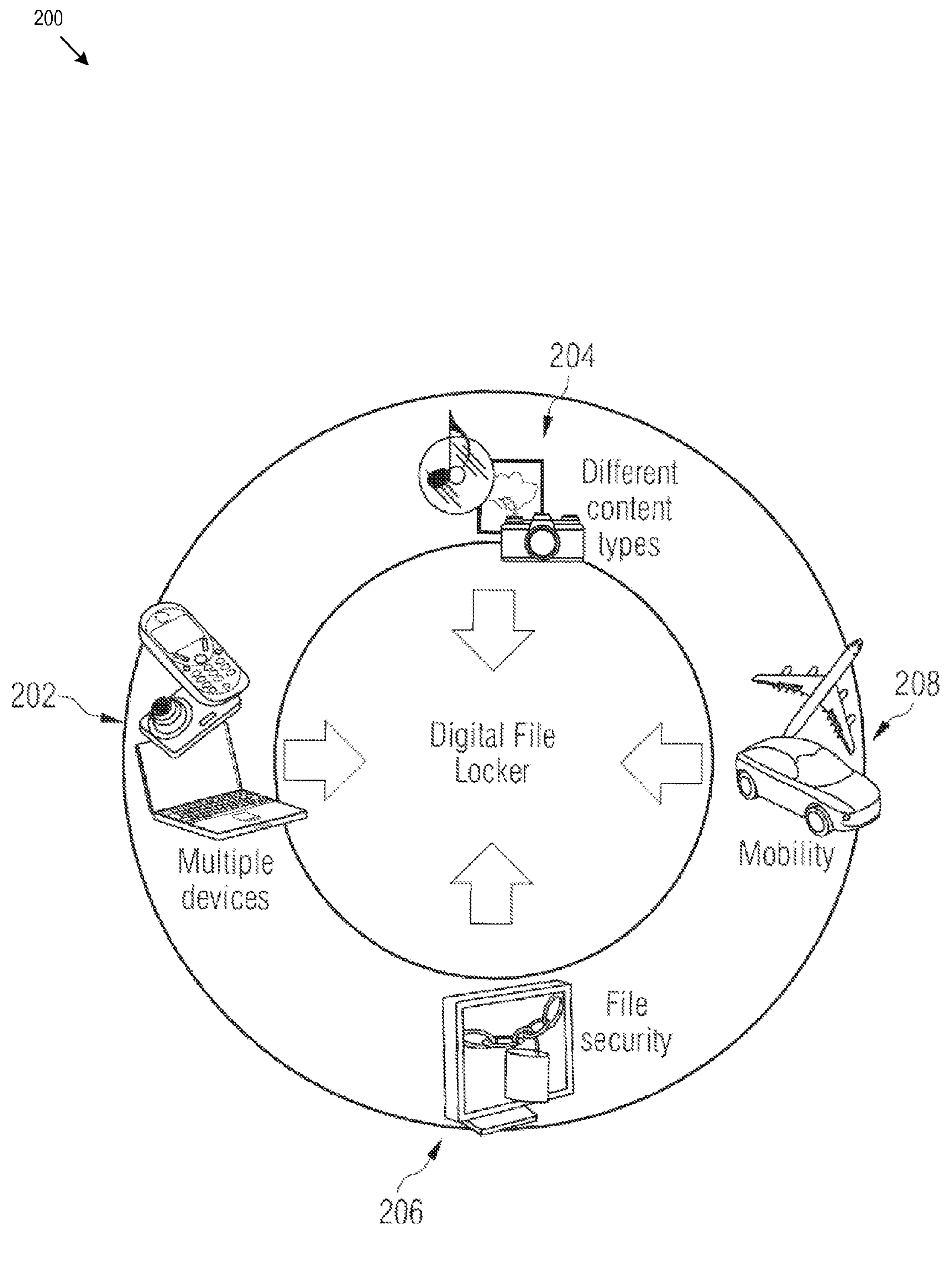
FIG. 2 shows a digital file locker overview.

FIG. 2 shows a digital file locker overview 200. Multiple devices 202 may provide and access multiple different content types 204 to the system 100. The system 100 provides file security 206 and is accessible regardless of the mobility characteristics 208 of the subscriber.

The system 100 manages and keeps safe subscriber digital content through a web interface with low complexity deployment and scalability. The system 100 increases collaboration by sharing content between employees and provides centralized content storing, for simple access and distribution. The system 100 also manages personal media files including pictures, multimedia files, documents and video recordings. The subscriber may access the system 100 from any mobile or fixed connection. The system 100 adds value to main services by providing an integrated answer to document management needs.

The system 100 may provide many different types of functionality. Examples include: File and folder management, including Create Folder, File Upload/Download, Tag management, and File rename/move/delete; Content Sharing, including File Transmission; Backup & Restore; Internet Protocol (IP) Video Recording; Access to Personal Content & Photo Album; and Other functionalities, including Advanced Search, Used space visualization, and Administrative control and Subscription through a Service Factory Catalogue.

Figure 3:
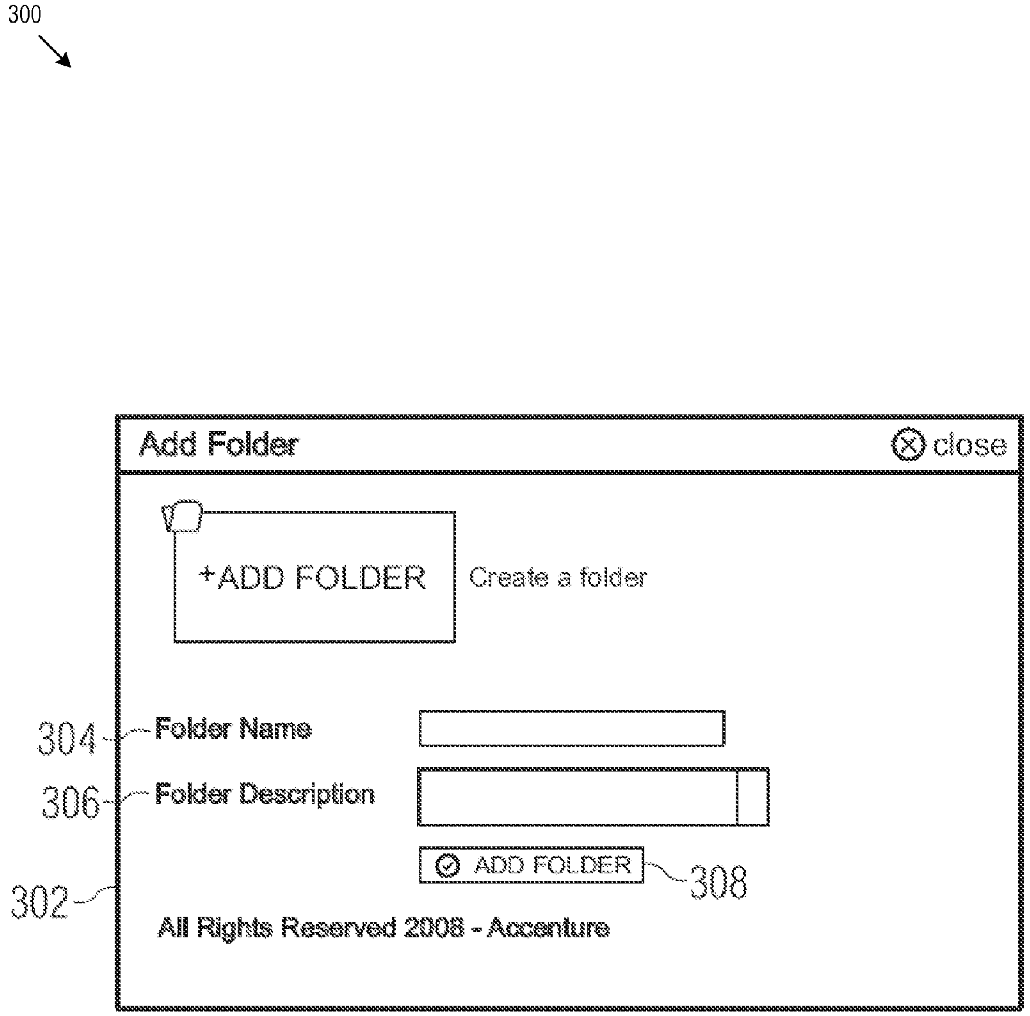
FIG. 3 shows a folder creation interface for a digital file locker system.

FIG. 3 shows a folder creation interface 300 for a digital file locker system that the logic 128 may generate. Before adding content the subscriber decides how to organize his DFL in the repository 106. The system 100 may provide default folders (e.g., for music and video). When the subscriber selects 'Add Folder' the interface 300 opens and allows the subscriber to create a new DFL, including hierarchically arranged structure. The interface 300 includes an add folder interface 302 including a folder name field 304, folder description field 306, and an add folder button 308. In response to subscriber input, the logic 128 creates folders in the repository 106.

Figure 4:
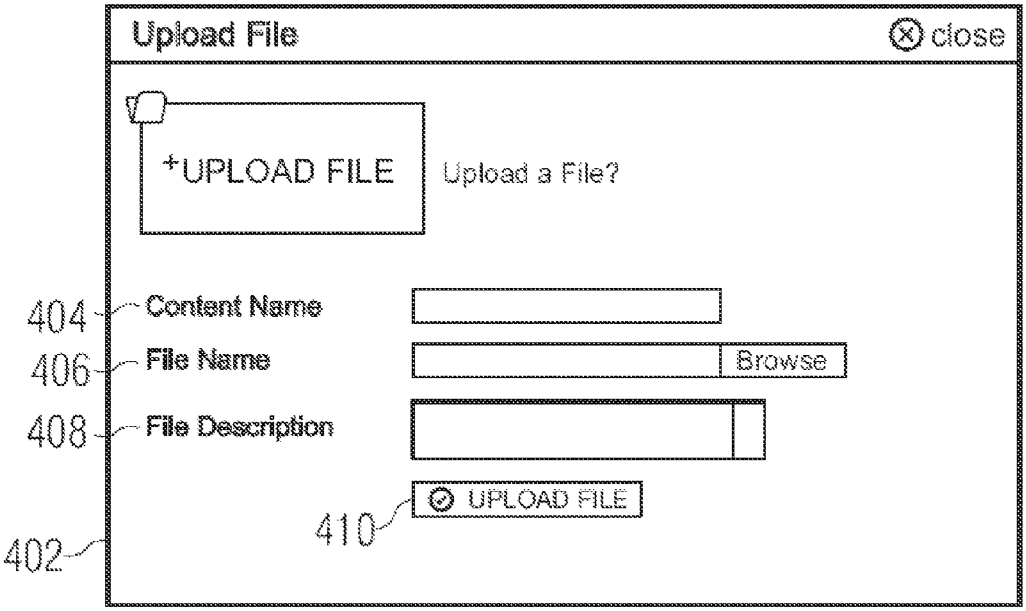
FIG. 4 shows a file upload and download management interface for a digital file locker system.

FIG. 4 shows a file upload and download management interface 400 for a digital file locker system that the logic 128 may generate. The interface 400 includes an upload folder interface 402 including a content name field 404, a filename field 406, a file description field 408, and an upload button 410. In response to subscriber input, the logic 128 uploads the specified file name into the repository 106 and attaches the specified file description and content name. When the subscriber selects 'Upload File', the subscriber may upload files from a PC or mobile phone to his DFL in the repository 106. The interface 400 opens to help the user to add content to a DFL. The logic 128 is adapted to provide uploading single files, whole folders, e-mail attachments, public content from the Web, and also is adapted to permit the subscriber to download files from any folder of his DFL to any device.

Figure 5:
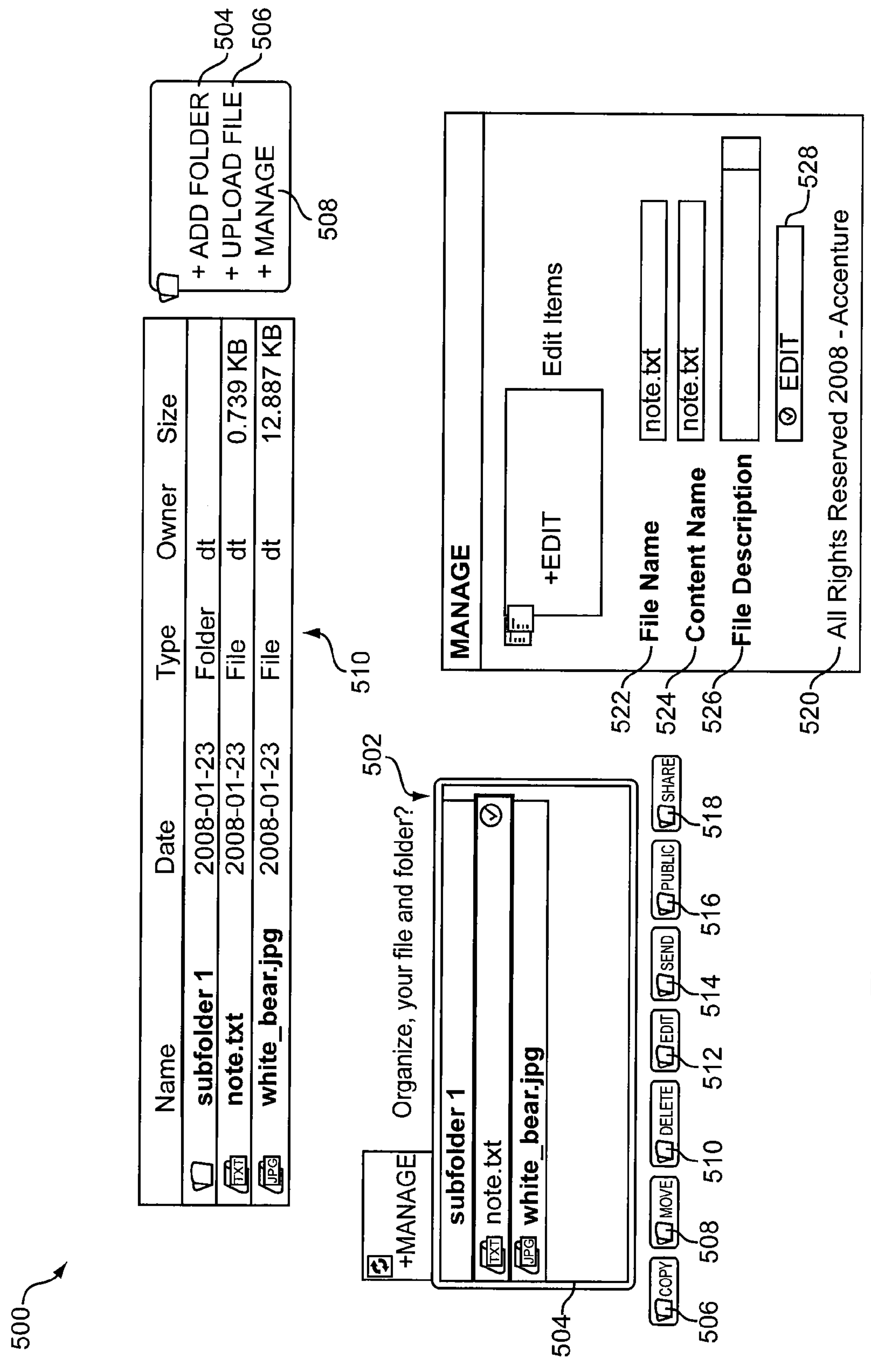
FIG. 5 shows a tag management interface for a digital file locker system.

FIG. 5 shows a file and folder management interface 500 for the logic 128, including a tag management interface 502. The interface 500 includes an 'Add Folder' button 504, an 'Upload File' button 506, and a 'Manage' button 508. The interface 500 further includes a content display section 510 that specifies folder names, hierarchical structure, content date, types, owner, sizes, and other characteristics.

The interface 502 is displayed when the 'Management' button 508 is selected. The interface 502 provides a content management command window 504. The window 504 may include content manipulation command buttons, including a copy button 506 (to copy data), a move button 508 (to move data to another DFL), a delete button 510 (to delete data), an edit button 512 (to update tags or other properties), a send button 514 (to communicate data to another subscriber), a public button 516 (to make data public), and a share button 518 (to specify selected subscribers who may access the data).

Figure 6:
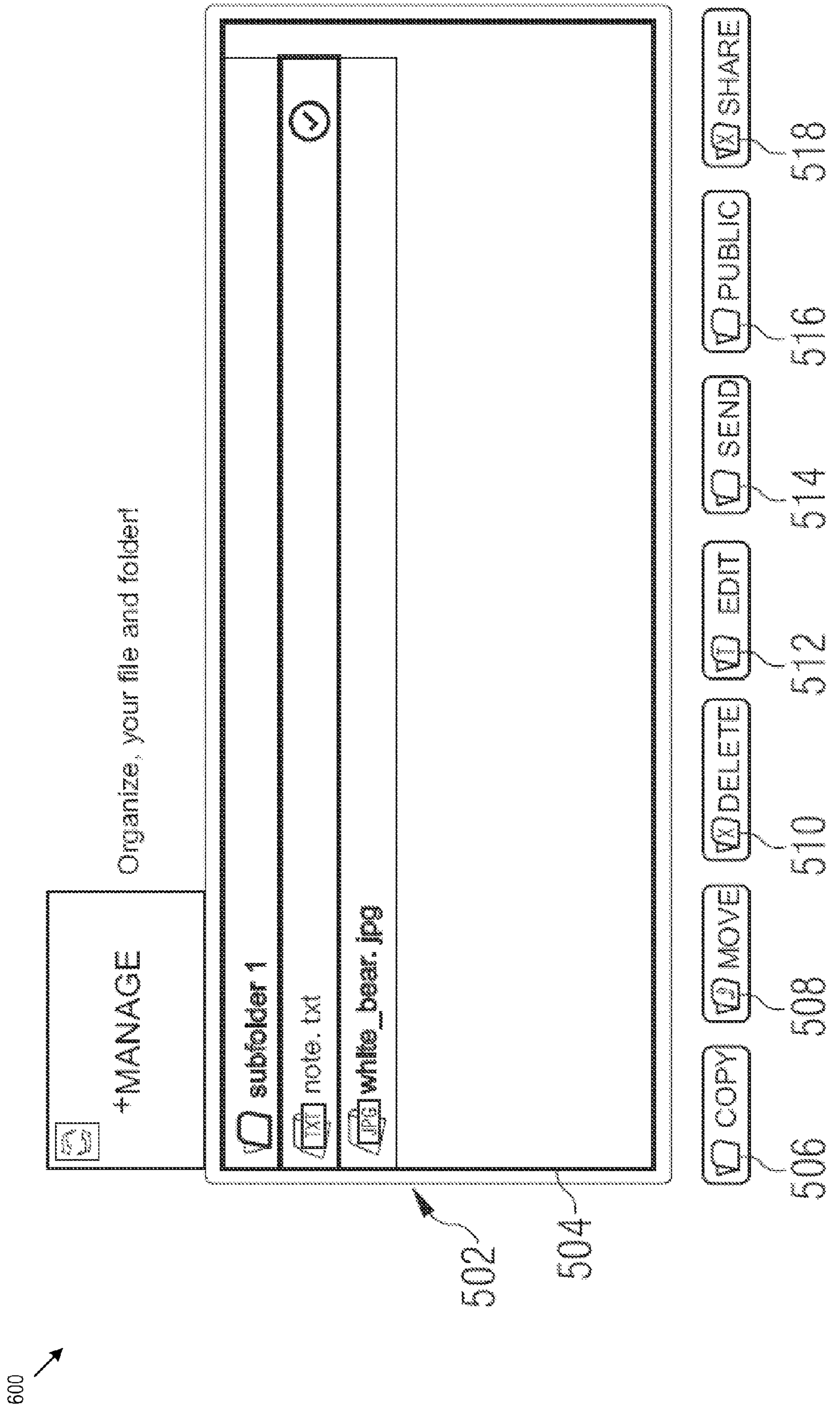
FIG. 6 shows a file renaming, moving, and deleting management interface for a digital file locker system.

FIG. 6 shows a file renaming, moving, and deleting management interface 502 in more detail. Clicking on the edit button 512, for example, displays the Edit interface 520. The edit interface 520 includes a file name field 522, a content name field 524, a file description field 526, and an edit accept button 528. The logic 128 updates the subscriber digital content according to the data entered in the fields 522-526. Similarly, the subscriber may rename content by selecting the edit button 512 and specifying a different name in the dialog window. The subscriber may also delete the selected file by clicking on the delete button 510, and may be asked to confirm the deletion. The subscriber may move a file by selecting the move button 508, and may copy a file to another folder by using the copy button 506.

Figure 7:
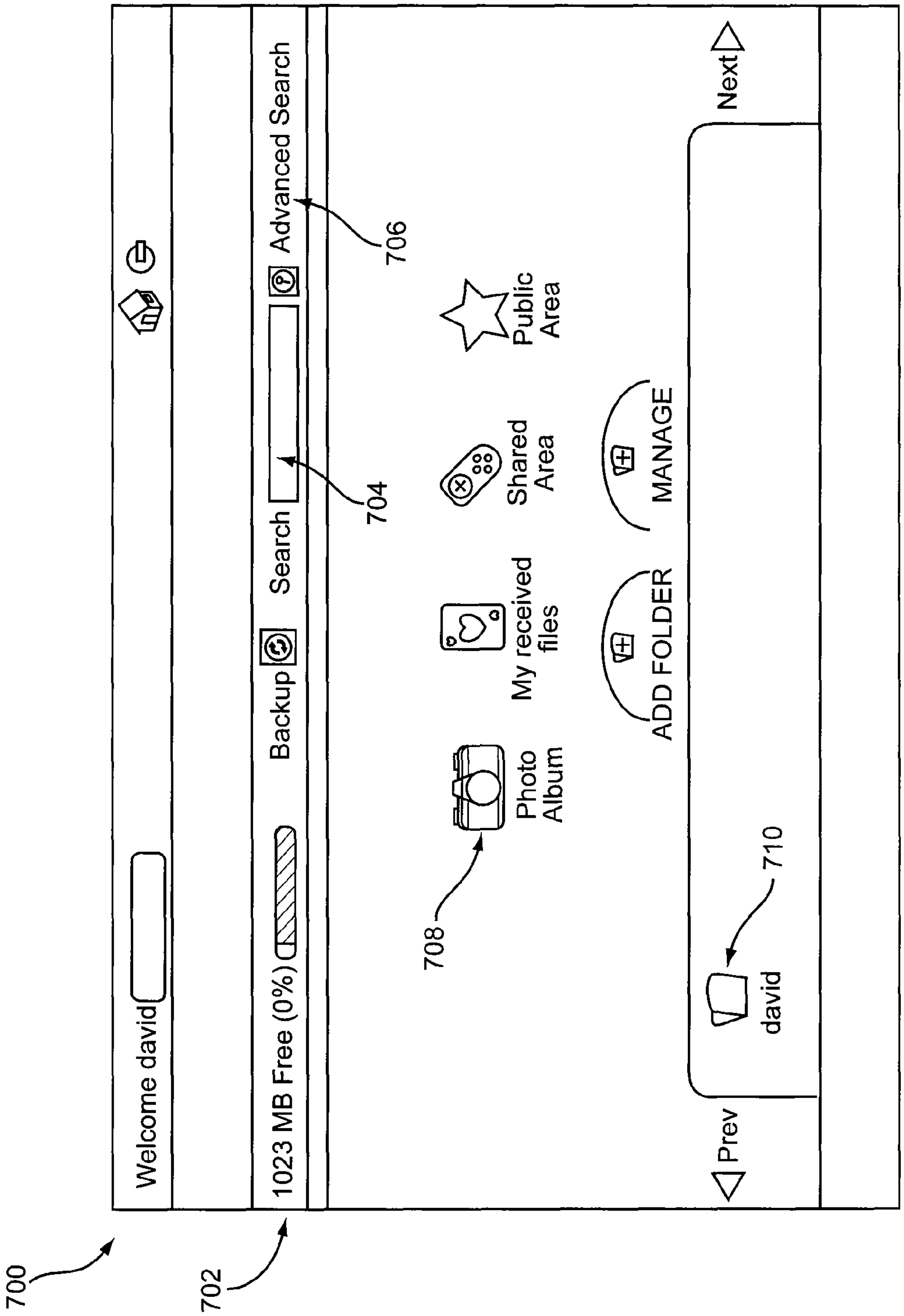
FIG. 7 shows a file and folder management interface.

FIG. 7 shows a main file and folder management interface 700 for the system 100. The interface 700 includes a use gauge 702, a search interface 704, with advanced search link 706, and a content selection icons 708 (e.g., for photos, received files, shared files, and public files). A DFL selector interface 710 is also shown. The system 100 allows the subscriber to manage folders and files from the interface 700. The subscriber may browse folders using the interface 710, select a specific folder, and create other folders with hierarchical structure. The subscriber may also set folder properties (e.g., private, shared, public). The subscriber may also upload files, navigate to files stored, and select and upload specific content to any DFL. Upon selecting a specific file, the subscriber may rename, delete or move the file to another folder.

Figure 8:
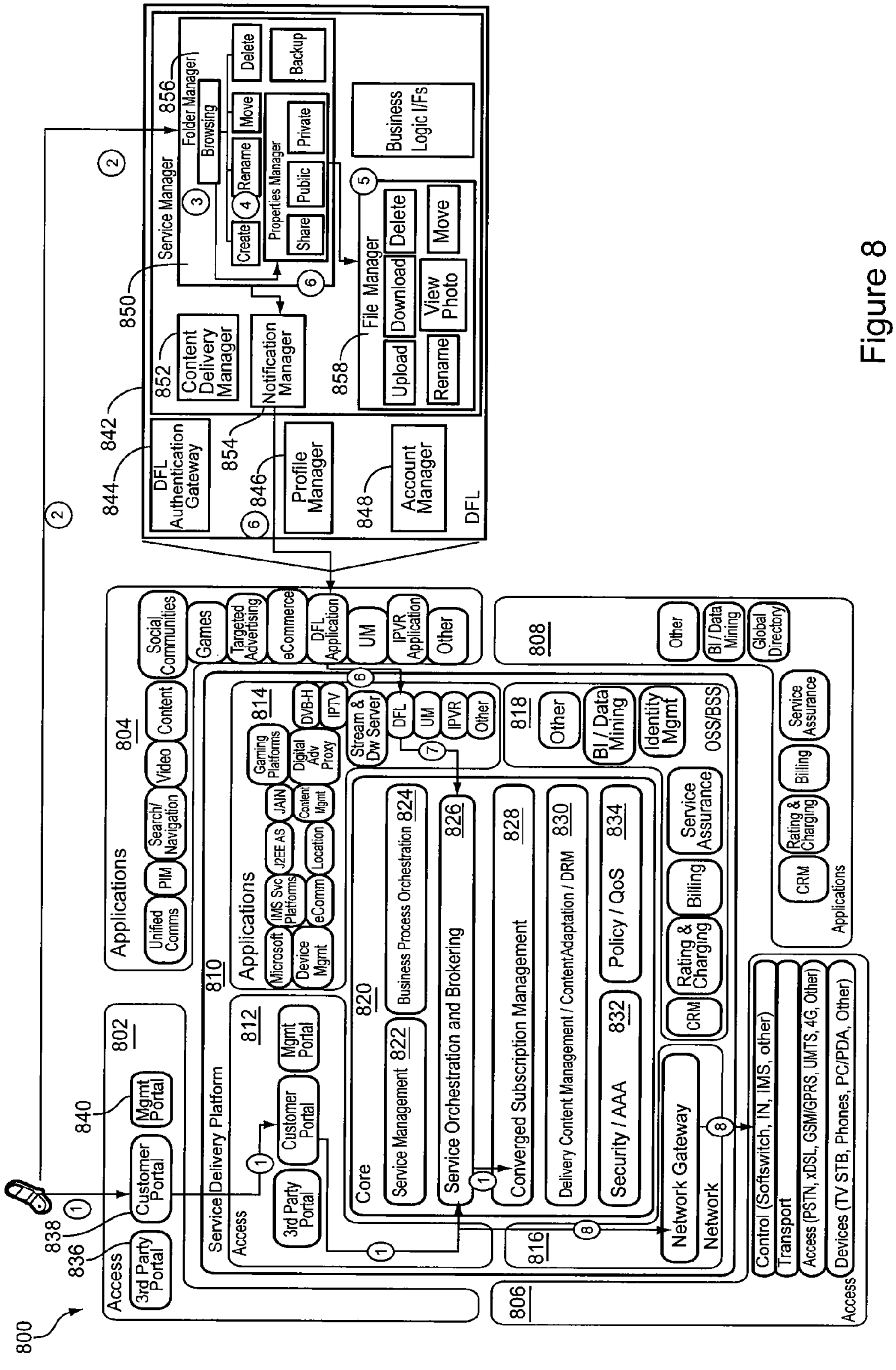
FIG. 8 shows a hardware platform for file and folder management.

FIG. 8 shows a hardware platform 800 for file and folder management. The platform 800 includes an access layer 802, an applications layer 804, a network layer 806, an Operational Support System (OSS)/Business Support System (BSS) layer 808, a service delivery platform (SDP) 810. The service delivery platform 810 may include interfaces for each layer, such as access interfaces 812, applications interfaces 814, network interfaces 816, and OSS interfaces 818. Core logic in the service delivery platform 810 is also present and may include: service management logic 822, business process orchestration logic 824, service orchestration and brokering logic 826, converged subscription management logic 828, delivery content management/content adaptation/digital restrictions management logic 830, security logic 832, and policy and quality of service logic 834.

The access layer 802 may include subscriber portal logic 836, management portal logic 838, and third party portal logic 840 through which subscribers, managers, and third parties access the platform 800. The application layer 804 includes the DFL application logic 842, which communicates with the service orchestration logic 826 to handle DFL operations.

The DFL application logic 824 includes a DFL authentication gateway 844, a profile manager 846, and an account manager 848. The DFL application logic 824 further includes a service manager 850 with a content delivery manager 852, notification manager 854, a folder manager 856, and a file manager 858. The folder manager 856 supports backups, browsing, creating, renaming, moving, and deleting files. The folder manager 856 also supports setting properties, such as shared, public, and private properties. The file manager 858 supports uploading, downloading, deleting, renaming, viewing (e.g., photos), and moving files.

Figure 9:
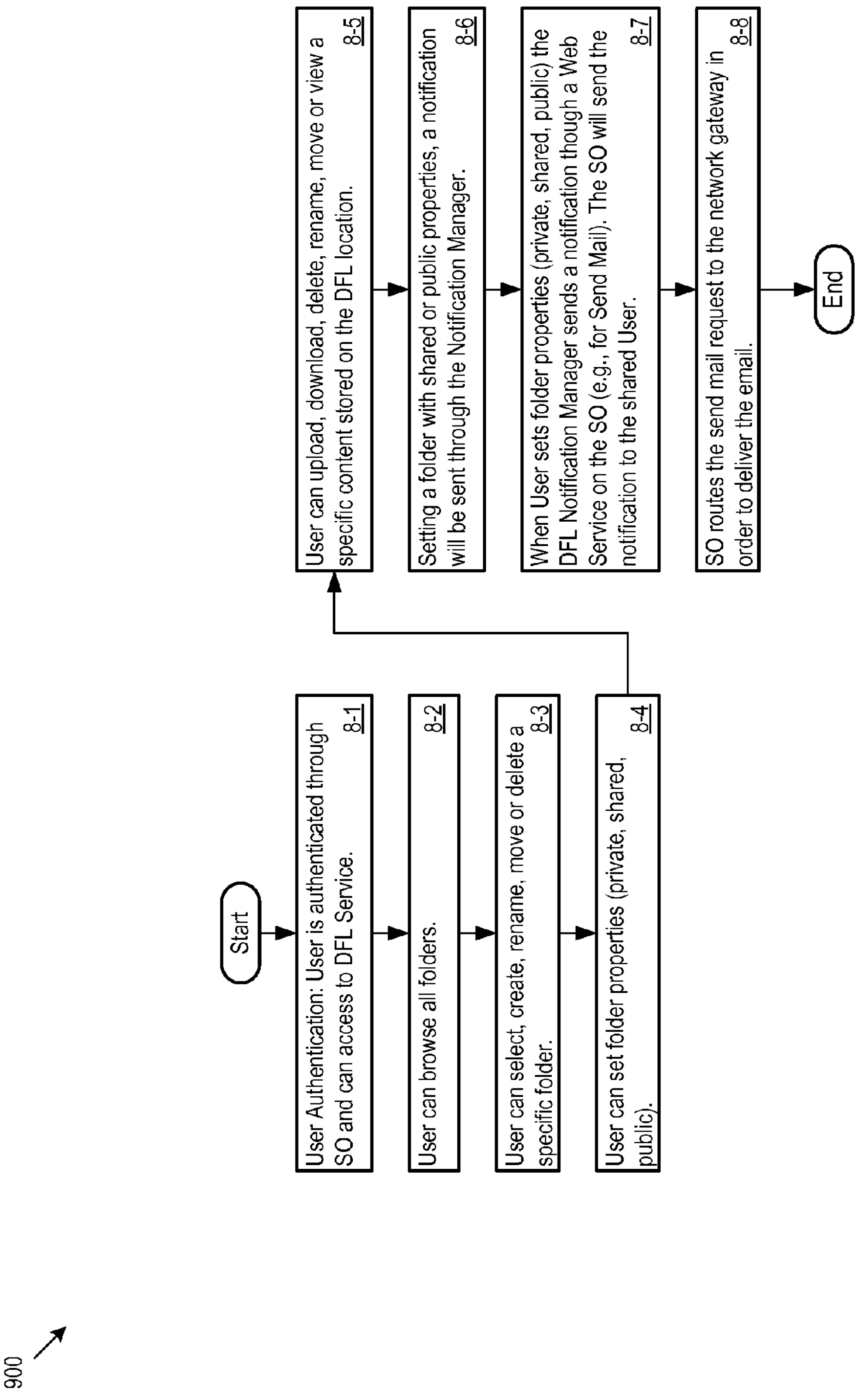
FIG. 9 shows a flow diagram for file and folder management logic.

FIG. 9 shows a flow diagram 900 for file and folder management logic interacting with the platform 800, as shown with the reference numbers 1-8 in FIG. 8. The subscriber authenticates with the service provider through the service orchestration (SO) 826 and converged subscription management (CSM) 828 (8-1). Using the DFL application logic 842, the subscriber may browse folders (8-2), select, create, rename, move, or delete folders (8-3), and set folder properties (e.g., private, shared, public) (8-4). Additionally, the subscriber may upload, download, delete, rename, move, or view content stored in the subscriber DFL (8-5).

When the subscriber sets folder properties (8-6), the DFL application logic 842 sends a notification (e.g., using a Web Service front end for a Send Mail application) to the service orchestration (SO) logic 826. The SO logic 826 sends the notification to the user that the subscriber added as allowed to share their subscriber content (8-7). The SO logic 826 routes the send mail request to the network gateway which coordinates mail delivery (8-8).

Figure 10:
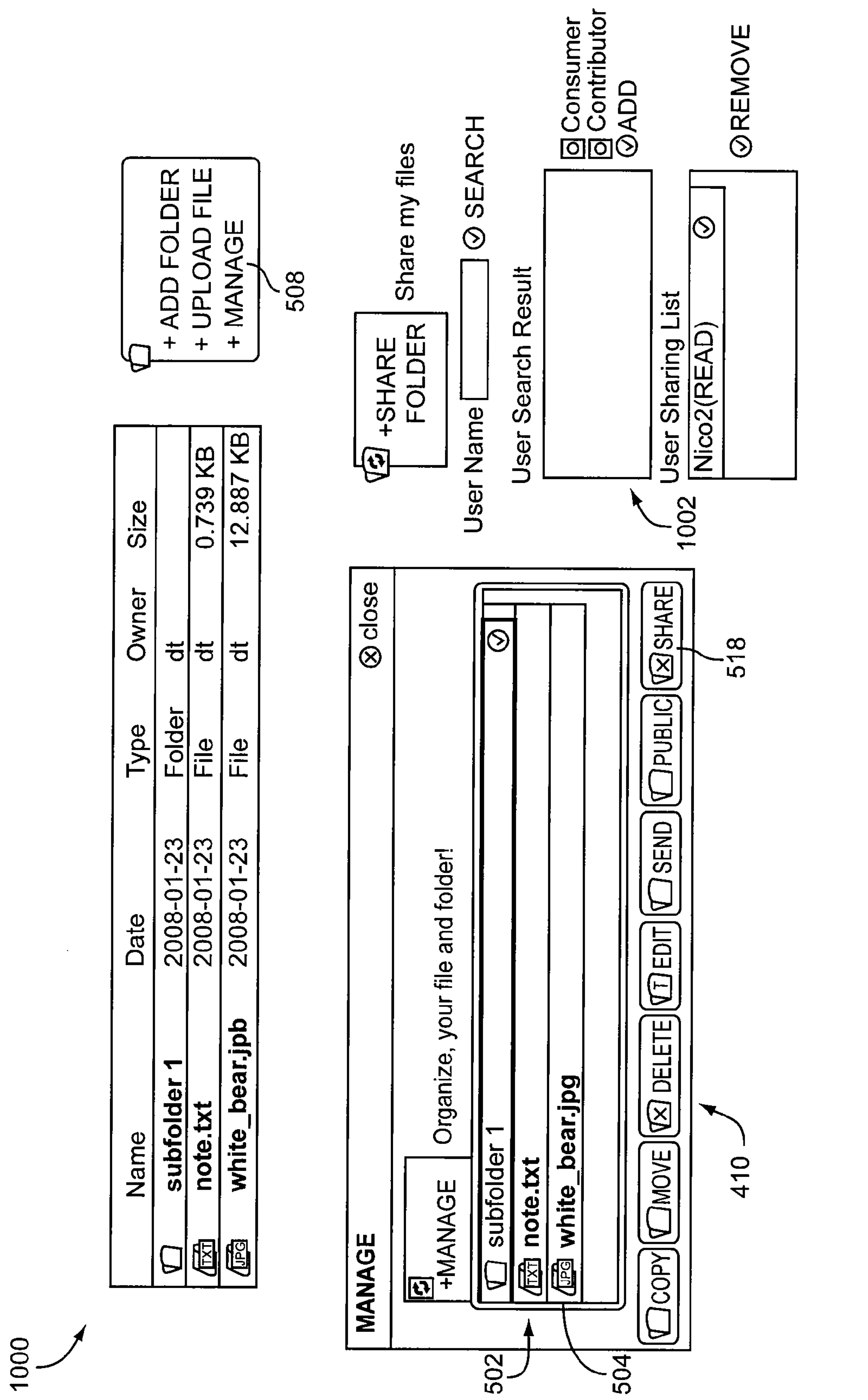
FIG. 10 shows a content sharing interface for a digital file locker system.

FIG. 10 shows a content sharing interface 1000 similar to that shown in FIG. 5 for a digital file locker system. The subscriber may share folder with friends or family, as examples. In an enterprise environment, shared folders may be used as a virtual workspace, in which users can work together on the same task from different locations and devices. To share folder the subscriber presses the manage button 508. The subscriber selects the folder and presses the share button 518. A share interface 1002 is displayer that prompts the subscriber to select from a list of entities to grant the access to the shared folder. When the operation is completed a mail or SMS is sent to the selected entities.

Figure 11:
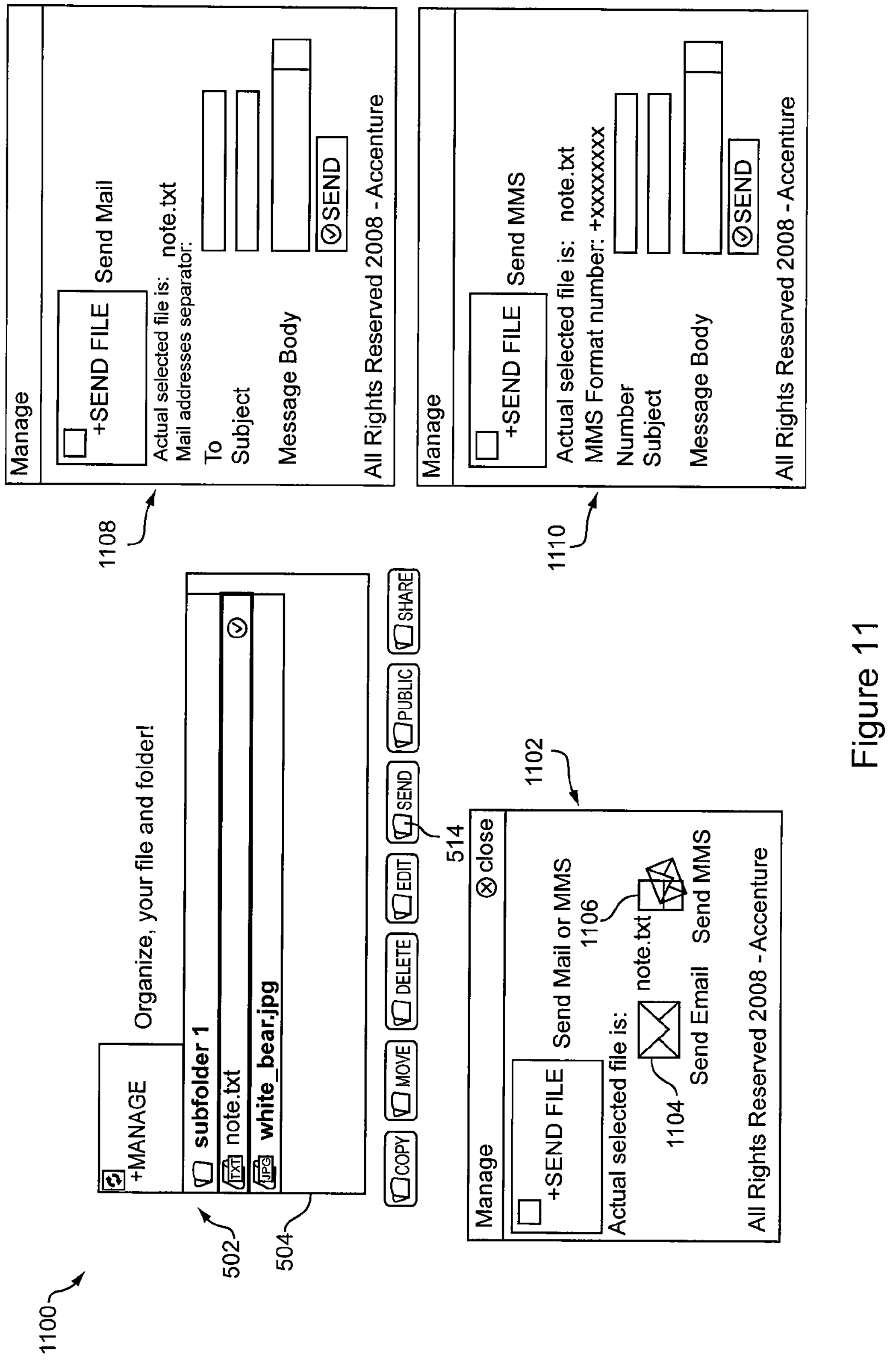
FIG. 11 shows a content forwarding interface for a digital file locker system.

FIG. 11 shows a content forwarding interface 1100 for a digital file locker system. The subscriber can forward multimedia content (photos, music, videos) stored in his DFL to any other entity. The subscriber selects one of the contents stored in his DFL and press the send button 514. The delivery selection interface 1102 appears, and allows the subscriber to choose to send the content as an attachment to an e-mail message 1104 or to send it as an MMS 1106. Depending on the selected sending mode the subscriber may specify the e-mail address using the email interface 1108 or mobile phone number of the recipient using the MMS interface 110.

The system 100 facilitates sharing contents with others such as friends/family. From the main DFL interface 700, the subscriber may open folders and access his DFL. Upon selecting a specific shared folder, the subscriber may add users that may access the content of folder. Upon selecting a specific shared folder, the subscriber may also delete users that can access the content of folder. Once finished, the subscriber may exit from the application.

Figure 12:
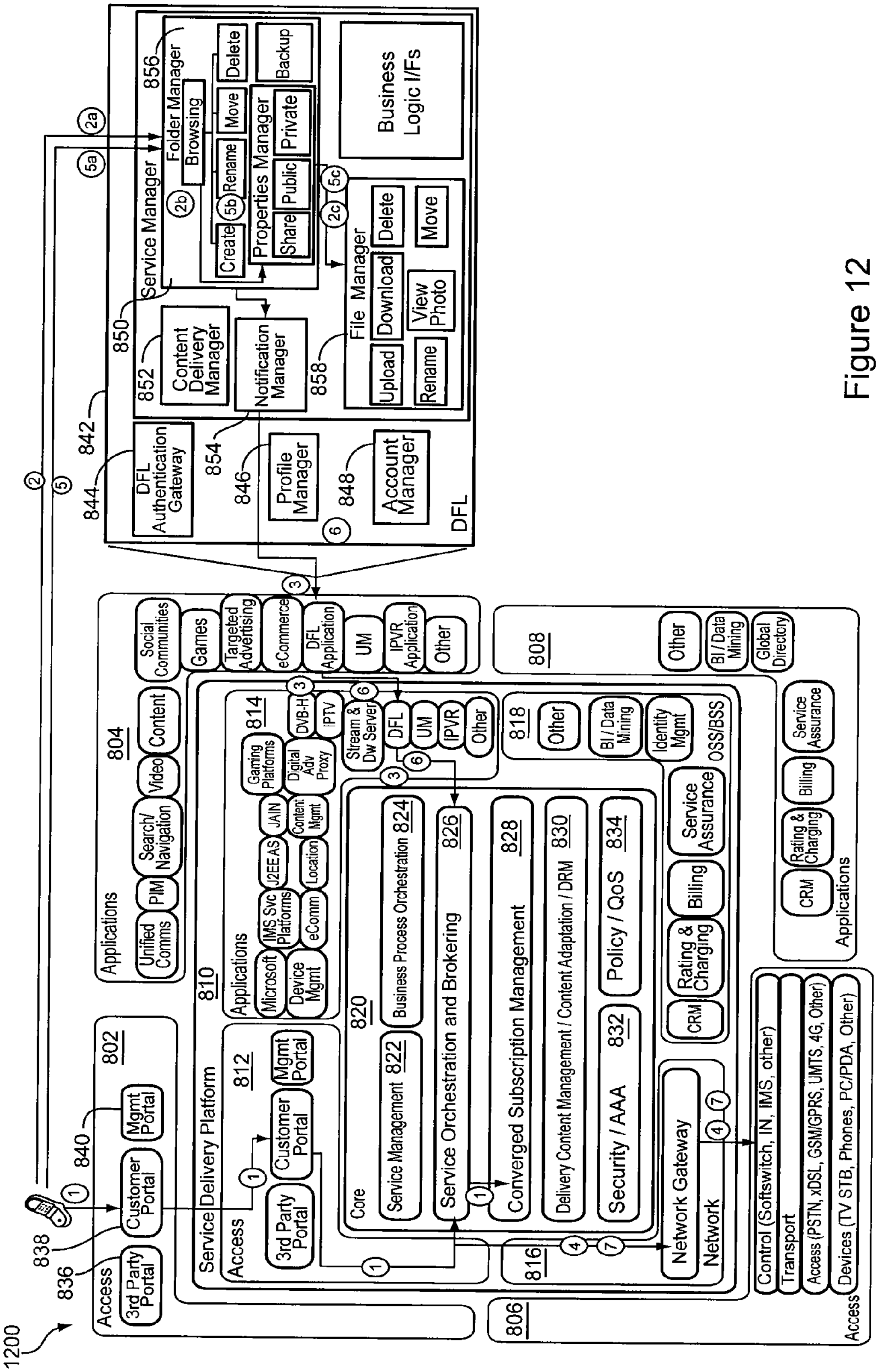
FIG. 12 shows a hardware platform for content sharing.
Figure 13:
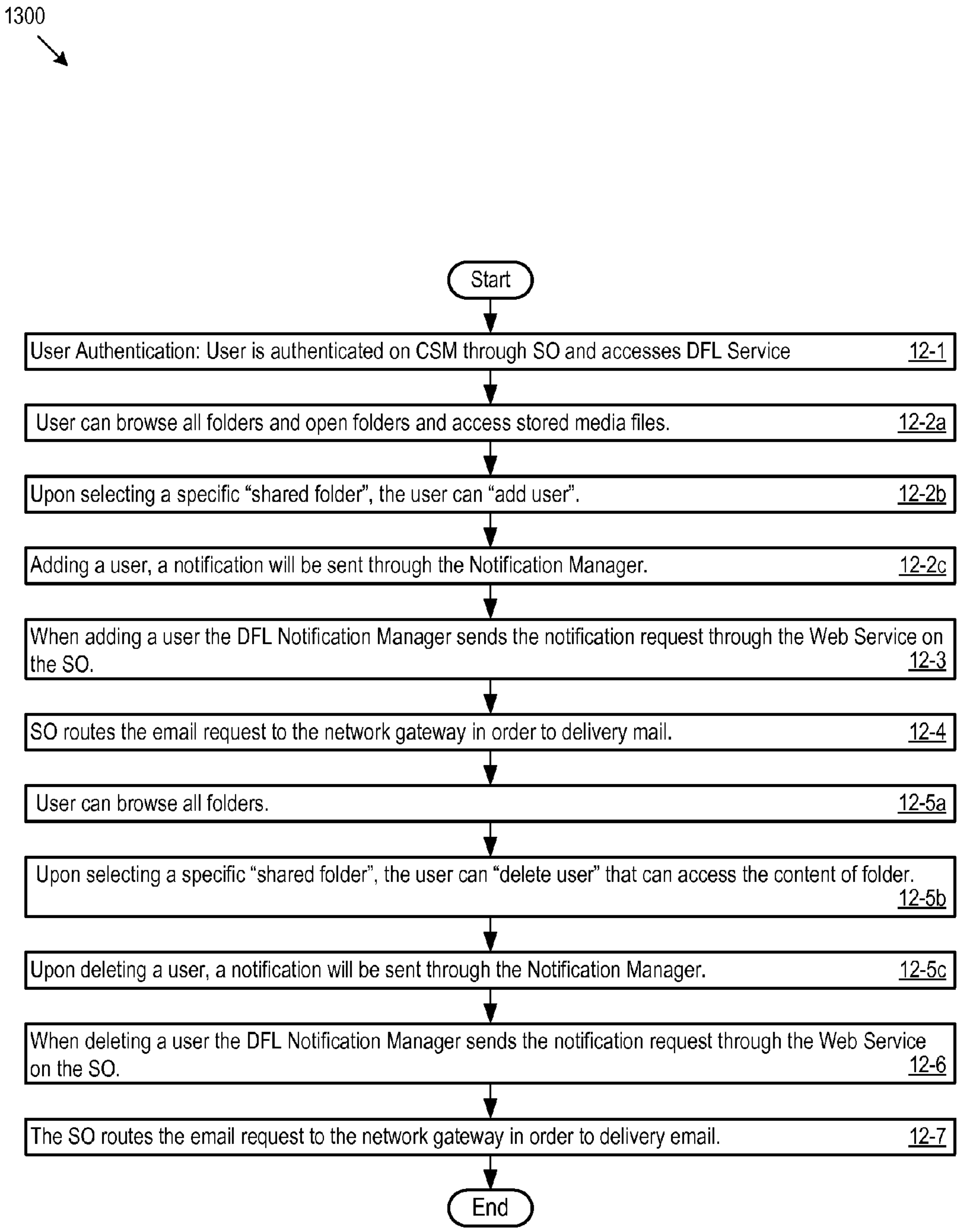
FIG. 13 shows a flow diagram for content sharing logic.

FIG. 12 shows a hardware platform 1200 for content sharing. FIG. 13 shows a flow diagram for content sharing logic interacting with the hardware platform 1200, with reference numbers back to FIG. 12. User Authentication: The subscriber is authenticated on CSM 828 through the SO logic 826 and can access DFL Service (12-1). The subscriber may browse all folders and open folders and access stored media files (12-2*a*). Upon selecting a specific "shared folder", the subscriber may "add user" (12-2*b*). Upon adding a subscriber, a notification will be sent through the Notification Manager 854 (12-2*c*).

When adding a user the DFL Notification Manager 854 sends the notification request through the desired Web Service on the SO 826 (e.g., a send mail Web Service) (12-3). The SO 826 routes the email request to the network gateway in order to deliver the email (12-4). The subscriber may also browse all folders (12-5*a*). Upon selecting a specific "shared folder", the user can "delete user" that can access the content of folder (12-5*b*). Upon deleting a user, a notification will be sent through the Notification Manager 854 (12-5*c*). When deleting a user the DFL Notification Manager 854 sends the notification request through the Web Service on the SO 826 (12-6). The SO 826 routes the email request to the network gateway in order to deliver the email (12-7).

Figure 14:
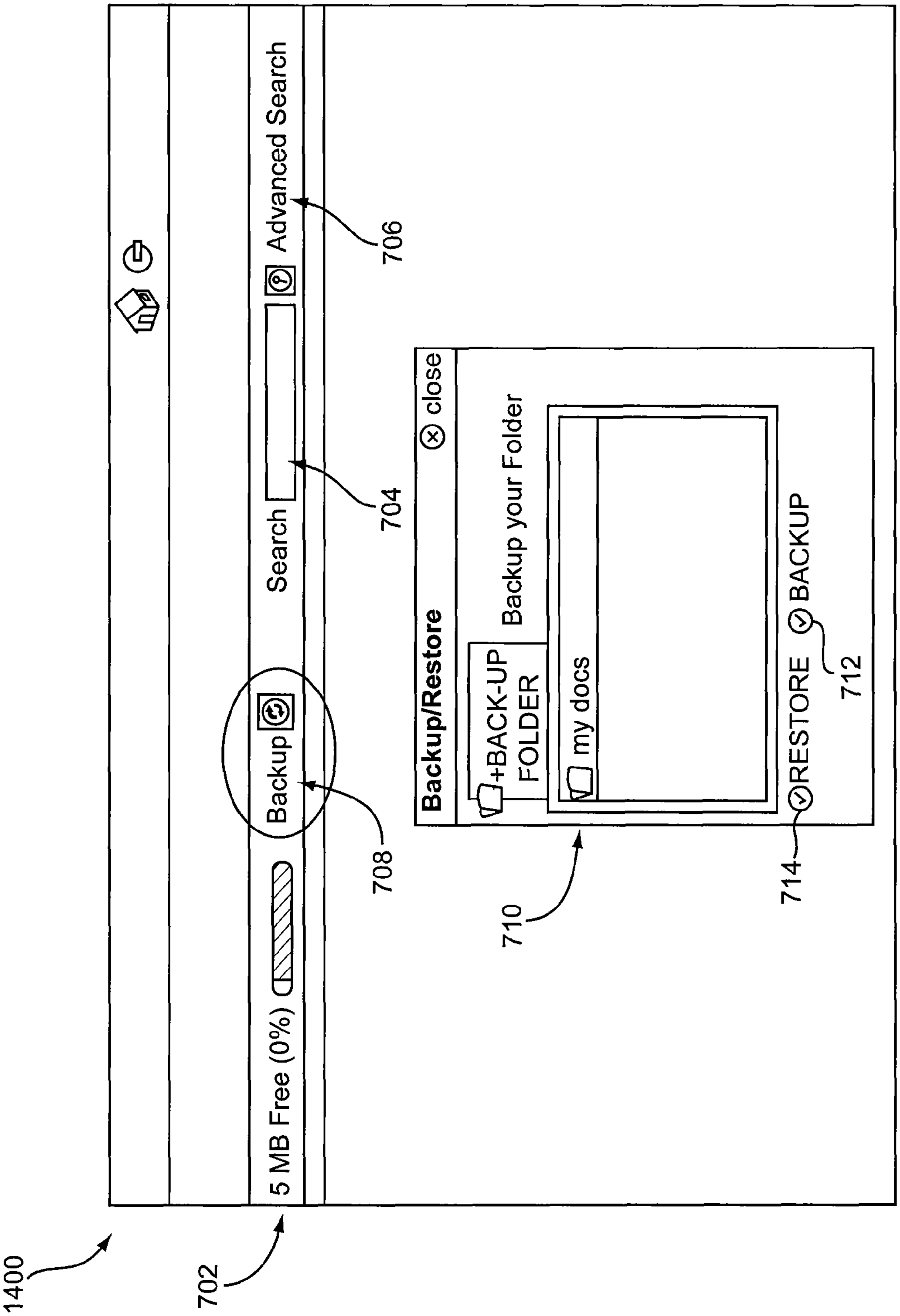
FIG. 14 shows a backup interface for a digital file locker system.

FIG. 14 shows a backup interface 1400 for a digital file locker system including a backup button 708. The system 100 responds to the backup button 708 by displaying the backup/restore interface 710. The subscriber selects a specific folder to backup listed in the interface 710 and presses the backup button 712. The backup procedure may execute on all subfolders and files contained in the selected folder. The subscriber may also restore backups by selecting the folder to be restored and clicking on the restore button 714.

In other words, the system 100 allows subscribers to access backup/restore features. The subscriber may browse his folders, select a specific folder (e.g. root) to choose the "backup folder". The entire sub-tree may be stored. If the backup folders already exist for the selected folder, the copy may be overwritten. From the DFL interface 700, the subscriber is also able to select "restore folder".

Figure 15:
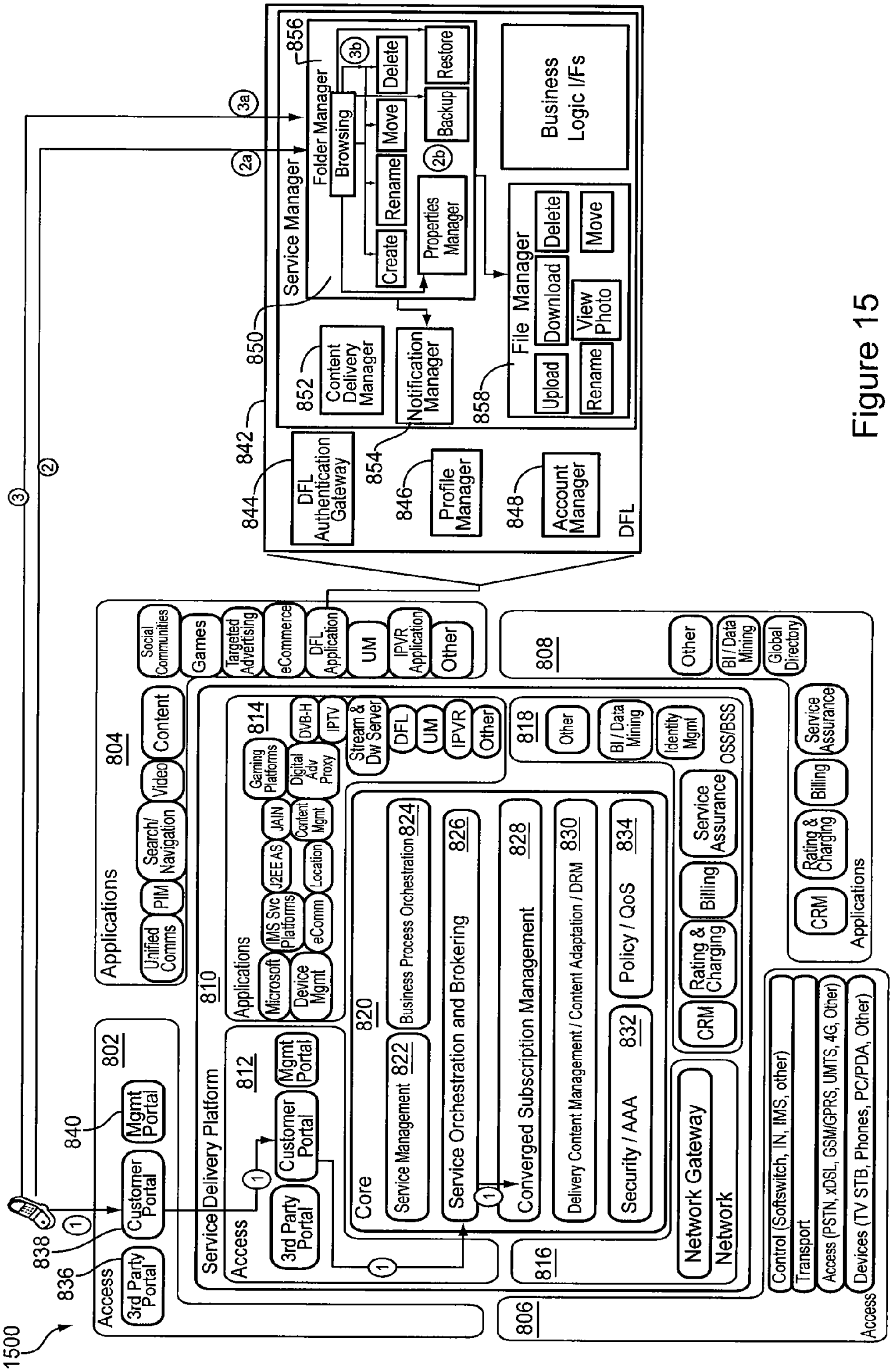
FIG. 15 shows a hardware platform for backup and restore operations.
Figure 16:
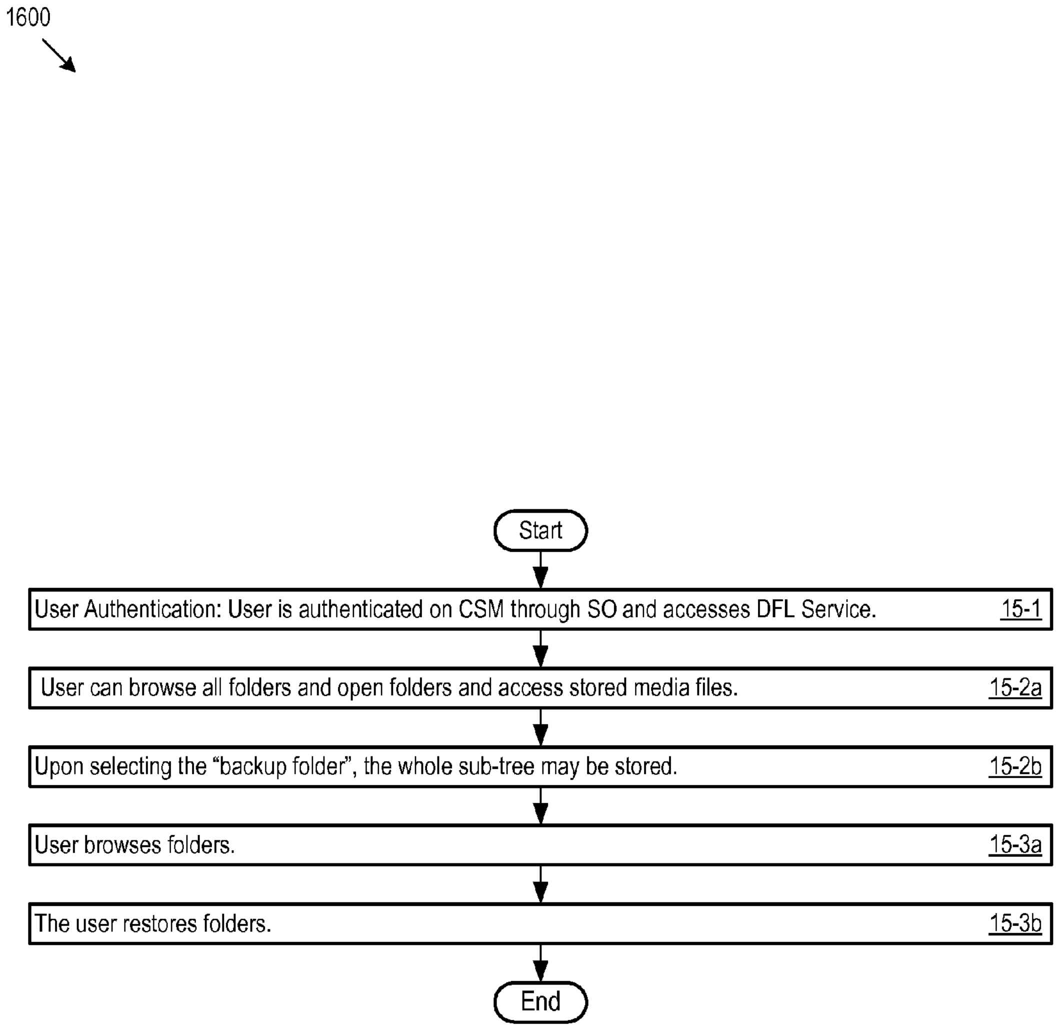
FIG. 16 shows a flow diagram for backup and restore logic.

FIG. 15 shows a hardware platform 1500 for backup and restore operations. FIG. 16 shows a flow diagram for backup and restore logic interacting with the hardware platform 1500, with reference numbers back to FIG. 15. User Authentication: the subscriber is authenticated on CSM 828 through SO 826 and accesses the DFL system 100 (15-1). The subscriber may browse all folders and open folders and access stored media files (15-2*a*). The subscriber may also select the backup folder, and the system 100 may store the whole subtree folder structure (15-2*b*). The subscriber may also browse folders (15-3*a*) and restore folders (15-3*b*).

Figure 17:
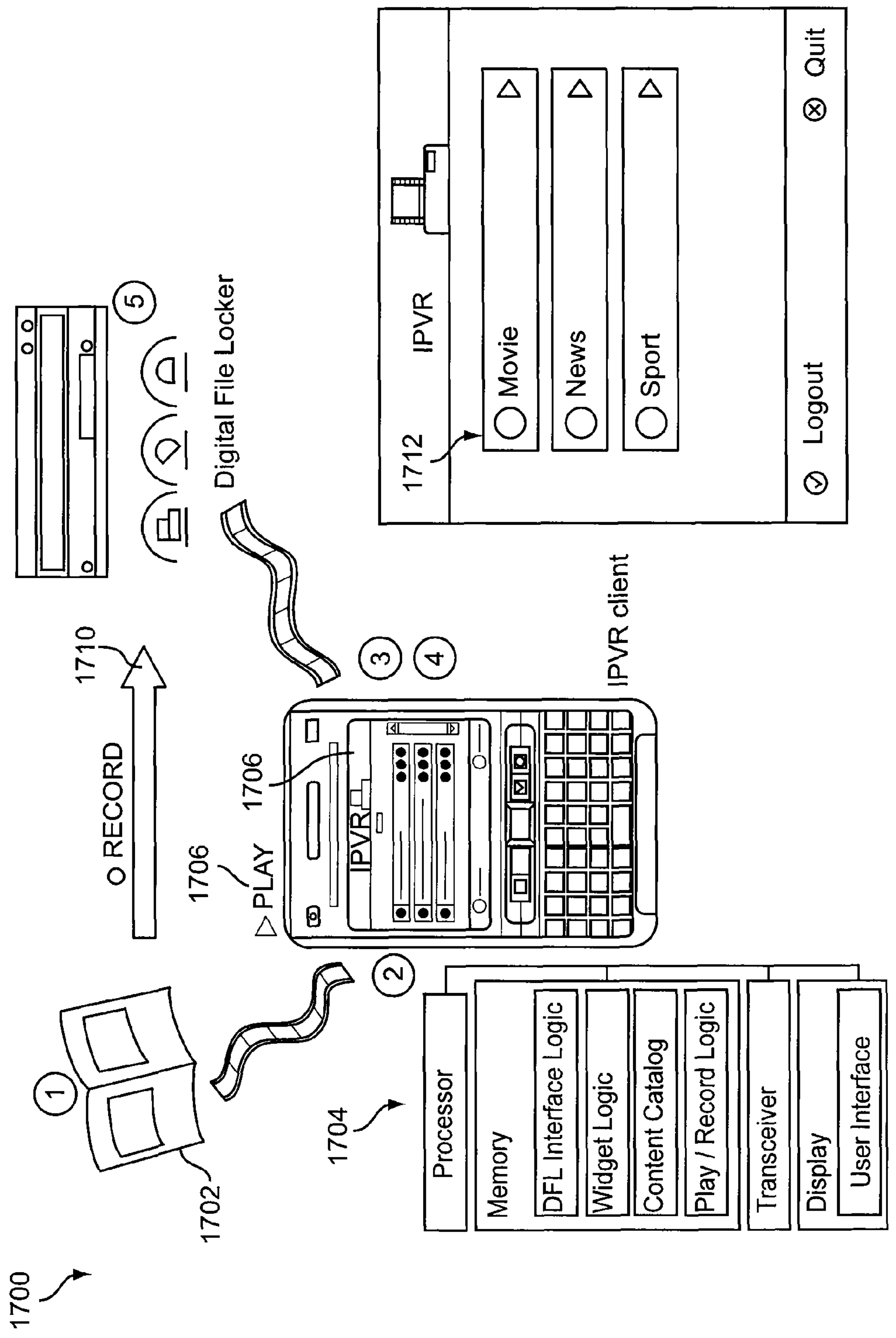
FIG. 17 shows a video recording logic diagram.

FIG. 17 shows a video recording logic diagram 1700. The subscriber starts a widget application 1702 that the endpoint 1704 (e.g., a cellular phone) provides. The endpoint 1704 includes a transceiver, including an antenna, amplifier, modulator/demodulator, and other waveform transmission/reception circuitry for interacting with the hardware platforms. To that end, the endpoint may also include a processor, a display, and a memory in which programs such as the DFL interface logic are stored. The DFL interface logic may provide the user interfaces for accessing the subscriber DFL and coordinating requests for content (e.g., playing or recording a video using play/record logic) and content management (e.g., deleting, moving, sharing, and renaming folders and files). As one example, the DFL interface logic may include the widget application 1702. The processor executes the widget application when commanded by the subscriber and displays the user interface 1708 on the endpoint 1704.

The widget application 1702 requests a content catalogue from the DFL system 100. The endpoint 1704 receives the content catalogue (e.g., containing video file entries) and displays the content catalogue for the subscriber in the user interface 1708. The subscriber browses the catalogue and chooses any of the available content, which may be organized according to any desired categories 1712. The subscriber clicks the play button 1706 on the user interface 1708. The play/record logic in the endpoint 1704 requests the video in streaming mode from the hardware platform for the subscriber to watch.

Alternatively, the subscriber may select the Record button 1710 on the interface 1708 to upload a video file to his DFL. The DFL stores the video content for future retrieval. Once the content is stored in the DFL, the subscriber may access the content by connecting to the system 100 from any location.

The system 100 thereby provides Internet Protocol (IP) Video Recording (IPVR) service and viewing service. The services allow the subscriber to access a video catalogue through a mobile handset or other endpoint. The subscriber may then choose to play content or record content to the DFL.

Figure 18:
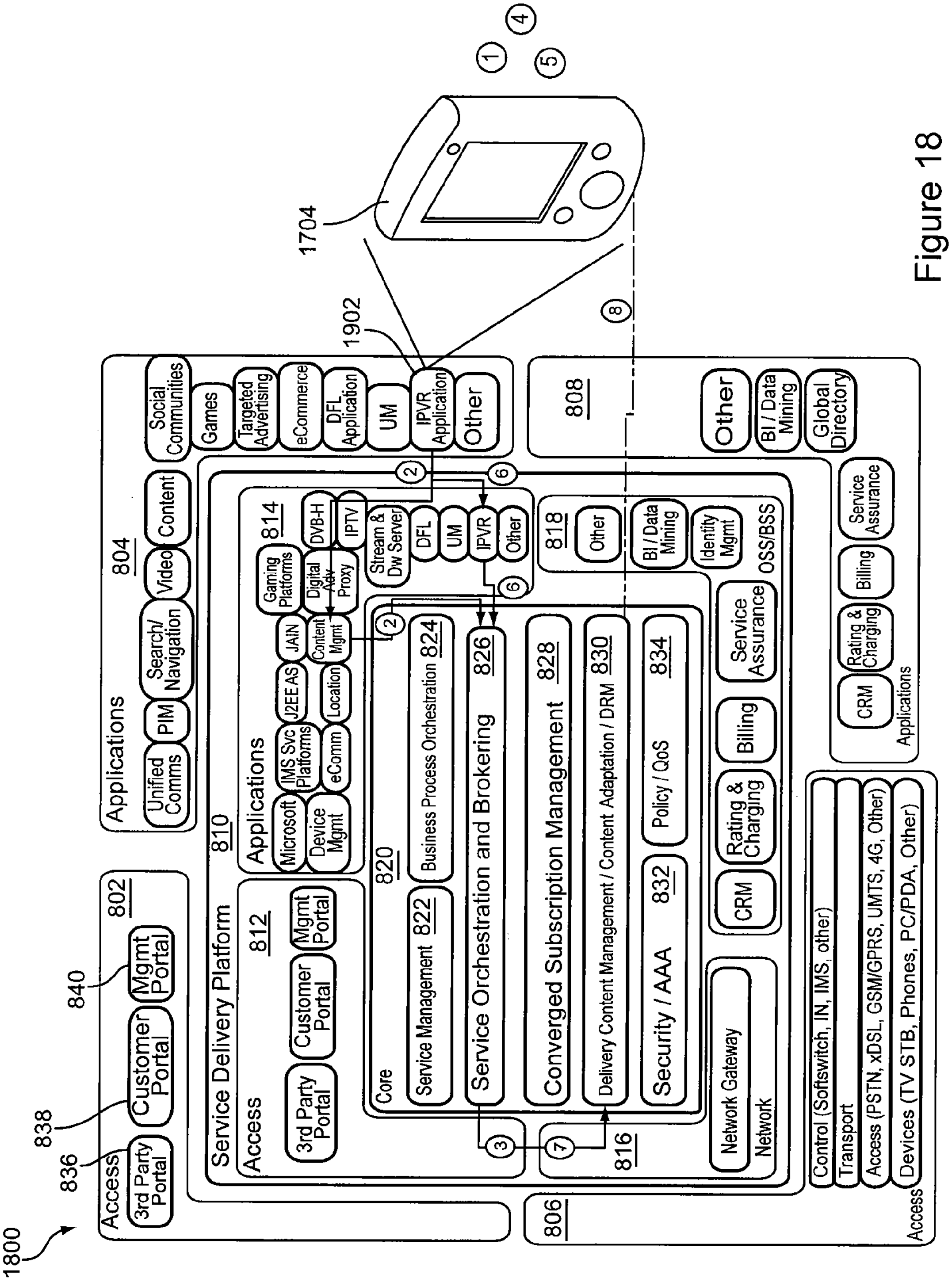
FIG. 18 shows a hardware platform for video play operations.
Figure 19:
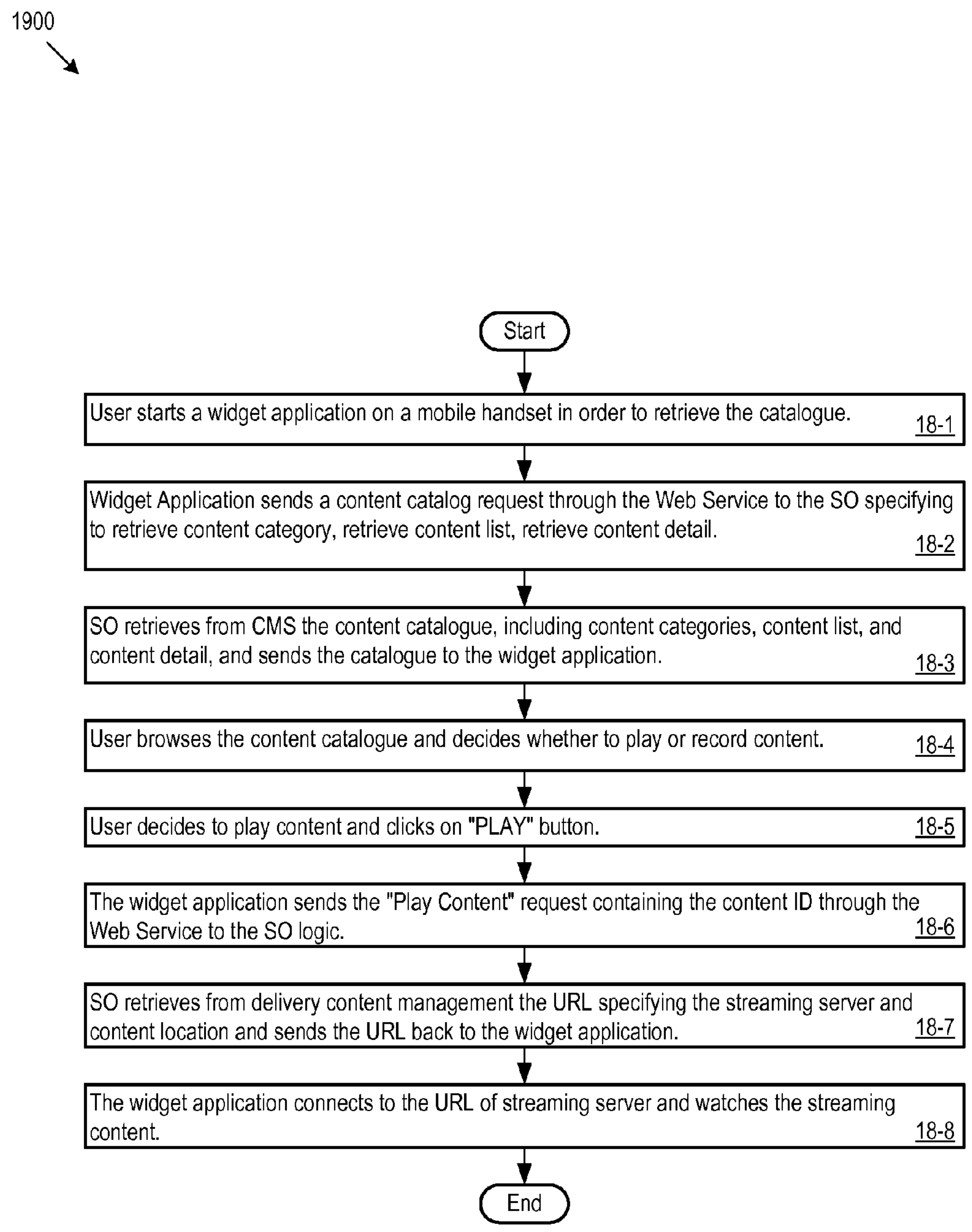
FIG. 19 shows a flow diagram for video play logic.

FIG. 18 shows a hardware platform 1800 for video play operations. The application layer 804 in the platform 1800 includes an IPVR application 1902 that interacts with the endpoint 1704 to provide video playback and recording capability. FIG. 19 shows a flow diagram for video play logic that interacts with the platform 1800, with reference numbers back to FIG. 18. The subscriber starts a widget application on an endpoint and the widget application retrieves a content catalogue (18-1). In particular, the widget application 1702 sends a content catalogue request (e.g., "Download CMS Mobile Catalogue") through to a Web Service on the SO logic 826 (18-2). The content catalogue request may specify to retrieve one or more of content categories, content lists, and content details.

The SO logic 826 retrieves from CMS logic 828 the content catalogue, which may include content categories, content lists, resource locator (e.g., video file server and filename), and content detail (18-3). The SO logic 826 then sends the content catalogue (e.g., as an extensible Markup Language (XML) file to the endpoint 1704 and the widget application 1702 (18-3). The subscriber browses the content catalogue and issues a video action selection request with respect to a content catalogue entry to play. Alternatively, the subscriber may issue a video action selection request to record content (18-4).

When the video action selection request is a video playback request (18-5), the widget application 1702 sends a "Play Content" request containing the content ID (e.g., a resource locator) through the Web Service to the SO logic 826 (18-6). The SO logic 826 retrieves from the delivery content management logic 830 the URL for a streaming server or other content delivery logic and sends the URL back to the widget application 1702 (18-7). The widget application connects to the URL of the streaming logic and views the streaming content (18-8). The streaming logic may be the delivery content management logic 830, which may transcode video data to any format requested by the subscriber, and which may enforce digital restrictions management on the subscriber.

Figure 20:
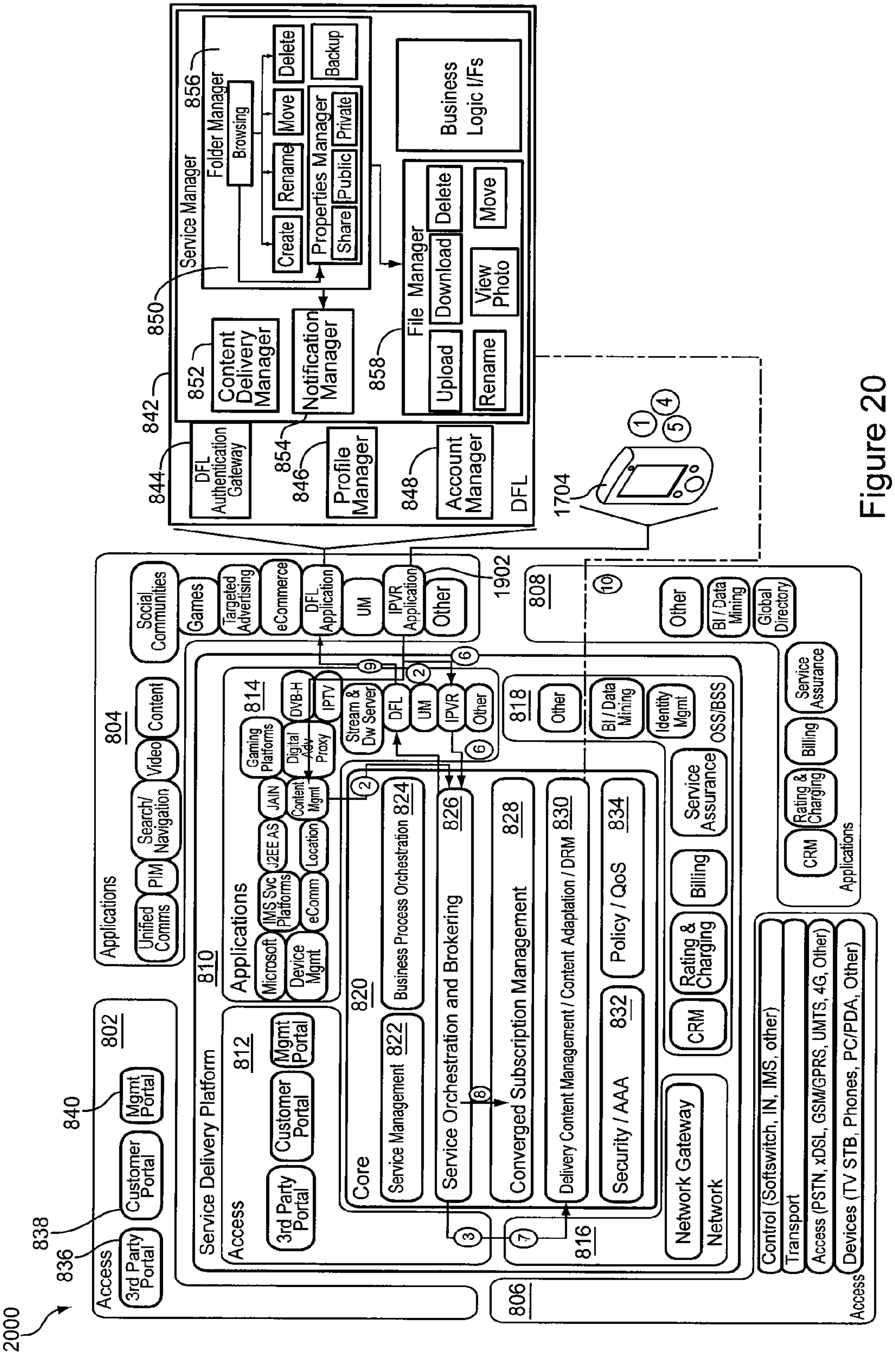
FIG. 20 shows a hardware platform for video recording operations.
Figure 21:
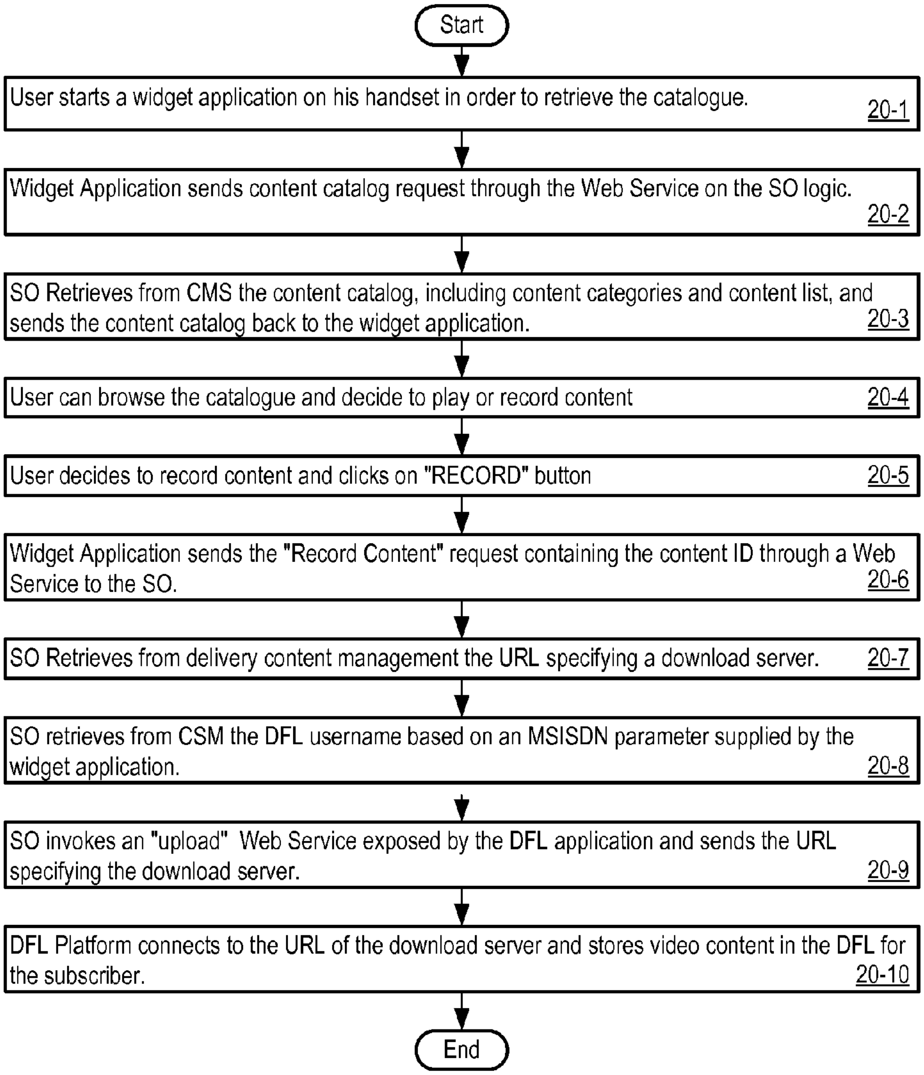
FIG. 21 shows a flow diagram for video recording logic.

FIG. 20 shows a hardware platform 2000 for video recording operations. FIG. 21 shows a flow diagram 2100 for video recording logic, with reference numbers back to FIG. 20. The subscriber starts a widget application 1702 on an endpoint 1704 and the widget application 1702 retrieves a content catalogue (20-1). In particular, the widget application 1702 sends a content catalogue request (e.g., "Download CMS Mobile Catalogue") through a Web Service on the SO logic 826 (20-2). The content catalogue request may specify to retrieve one or more of content categories, content lists, content details, or other video content information.

The SO logic 826 retrieves from CMS the content catalogue, which may include content categories, content lists, and content detail (20-3). The SO logic 826 then sends the content catalogue (e.g., as an extensible Markup Language (XML) file to the endpoint 1704 and the widget application 1702 (20-3). The subscriber browses the content catalogue and issues a video action selection request with respect to a content catalogue entry to play, or to record content (20-4).

When the video action selection request is a video record request (20-5), the widget application 1702 sends a "Record Content" request containing the content ID (e.g., a resource locator) through the Web Service to the SO logic 826 (20-6). The SO logic 826 retrieves from the delivery content management logic 830 a URL or other location indicia specifying a download server (20-7). The SO logic 826 also retrieves from the CSM logic 828 the username associated with the DFL for the subscriber (20-8). In one implementation, the CMS logic accepts a Mobile Subscriber Integrated Services Digital Network Number (MSISDN) from the widget application 1702, and searches based on the MSISDN to obtain the associated username.

The SO logic 826 then invokes an upload Web Service (or other interface) that the DFL application 842 exposes (20-9). The SO logic 826 sends the URL of the download server to the upload web service. The DFL application 842 then connects to the URL of the download server and stores the video content with the download server. The DFL application 842 may also create a filename or other content entry in the DFL assigned to the subscriber that represents the newly stored video content (20-10). Thus, the platform 2000 facilitates recording of video content captured by the endpoint 1702 in the DFL for the subscriber.

Figure 22:
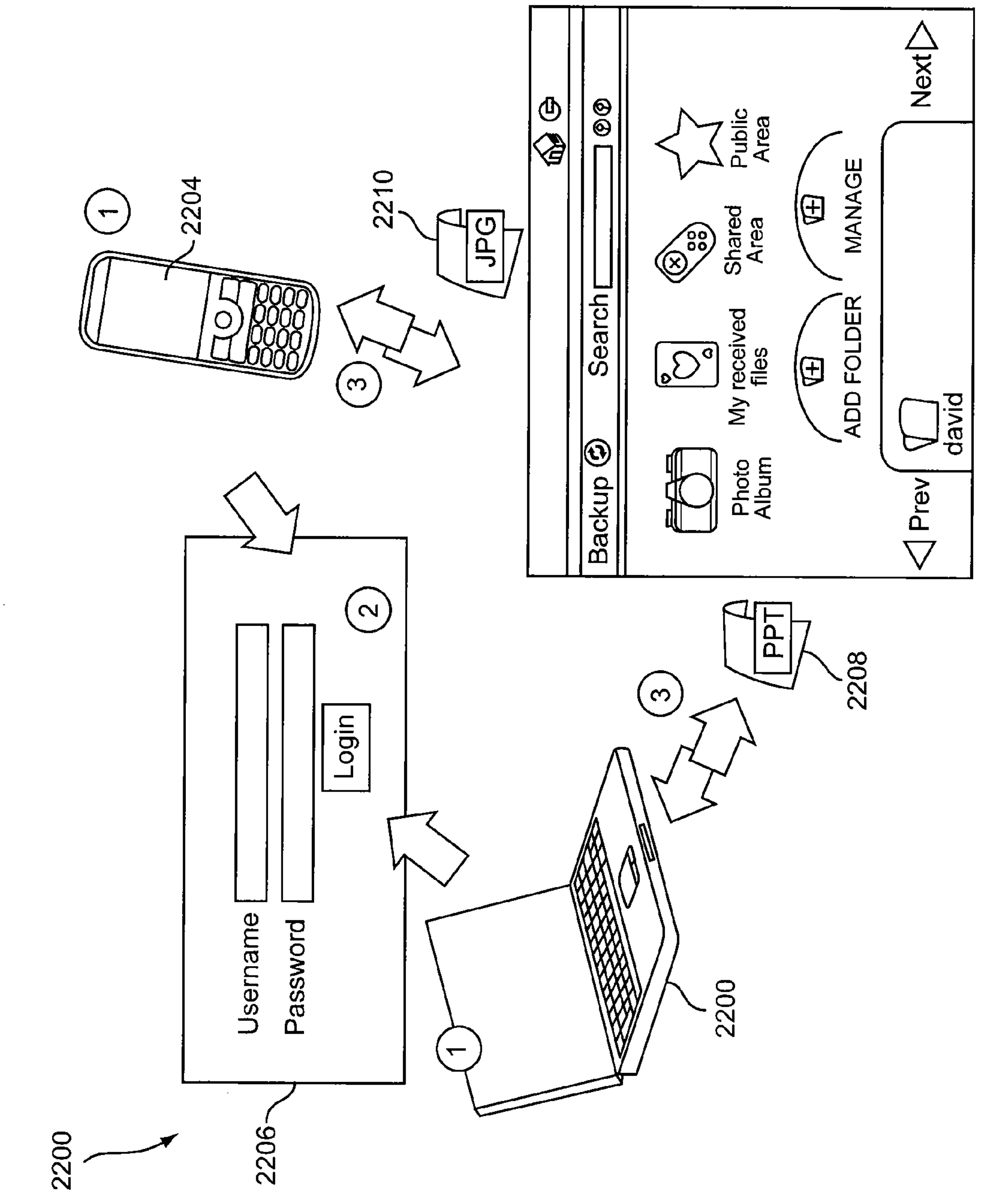
FIG. 22 shows a personal content access interface for a digital file locker system.

FIG. 22 shows a personal content access interface 2200 for a digital file locker system. The files hosted in the DFL virtual space are accessible via any endpoint, such as a personal computer 2202 and a mobile phone 2204. The subscriber connects to the login webpage 2206 using a WAP/GPRS/UMTS or a WiFi/Wired connection. Once logged in, the subscriber can access content 2208, 2210 uploaded/downloaded between the DFL for the subscriber and the endpoint.

Figure 23:
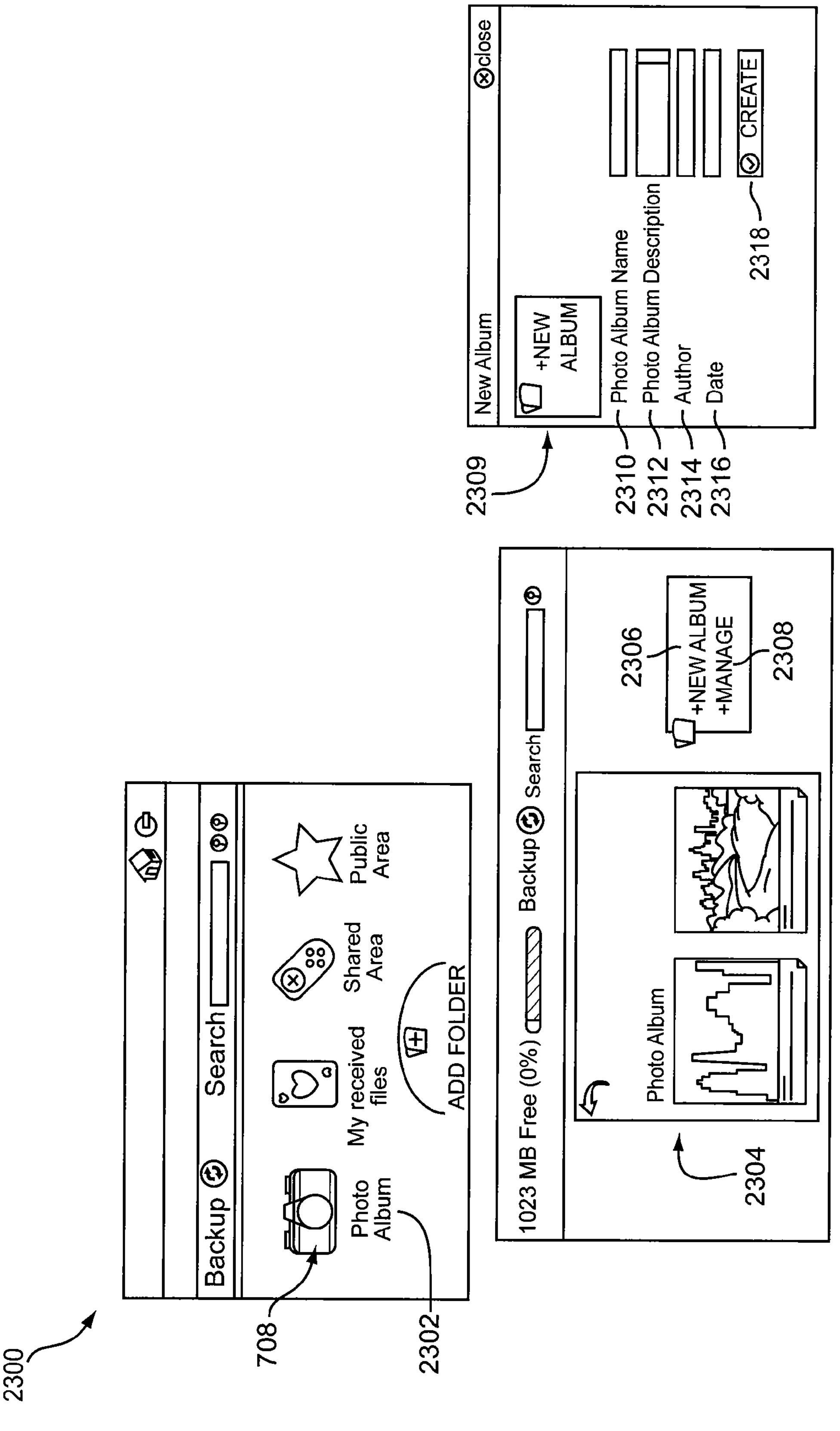
FIG. 23 shows a photo management interface for a digital file locker system.

FIG. 23 shows a photo management interface 2300 for a digital file locker system. Each subscriber may have a default photo folder 2302 (e.g., labeled 'Photo album') to which the subscriber may upload/delete his pictures. The subscriber may enter the Photo Album interface 2304, and see his Albums and pictures stored inside. The subscriber may also manage the photo album, including creating new albums using the New Album button 2306 and may use the Manage button 2308 to select album covers, add comments to the pictures, or take other actions. An example of the new album interface 2309 is shown and includes a name field 2310, a description field 2312, an author field 2314, a date field 2316, and a create button 2318.

In other words, the DFL system facilitates subscriber management, access, and use of personal media content from the DFL interface 700. From the DFL interface, the subscriber may open folders and access stored media files. Upon selecting a photo the subscriber may view the photo in full screen mode. From the Photo Album folder, the subscriber may view photo content in slide-show mode and choose a cover for album. The subscriber may also forward the photos/videos to any other entity using MMS or may place any content in a specific folder (e.g. public) for which he has credentials.

Figure 24:
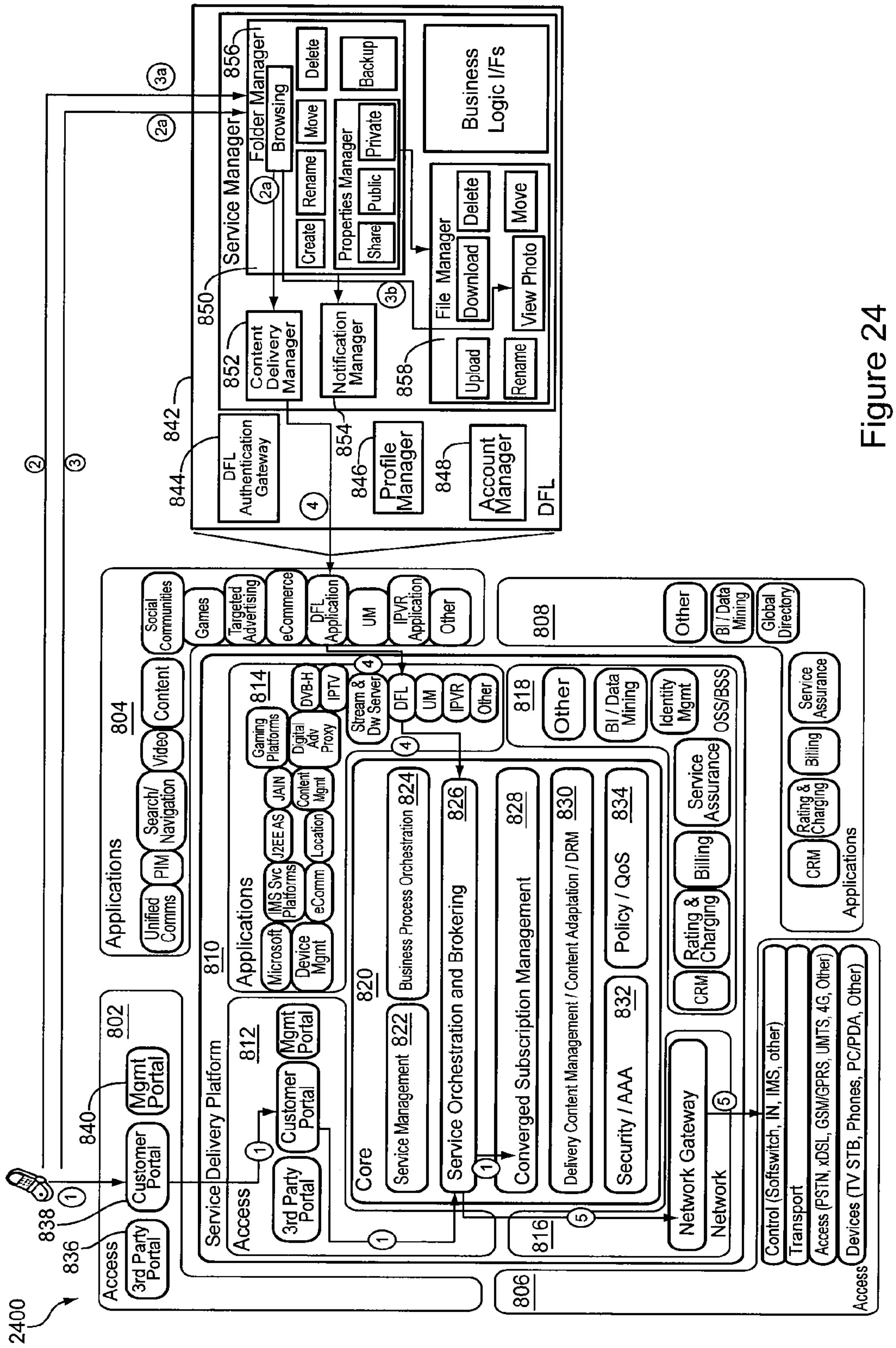
FIG. 24 shows a hardware platform for photo access.
Figure 25:
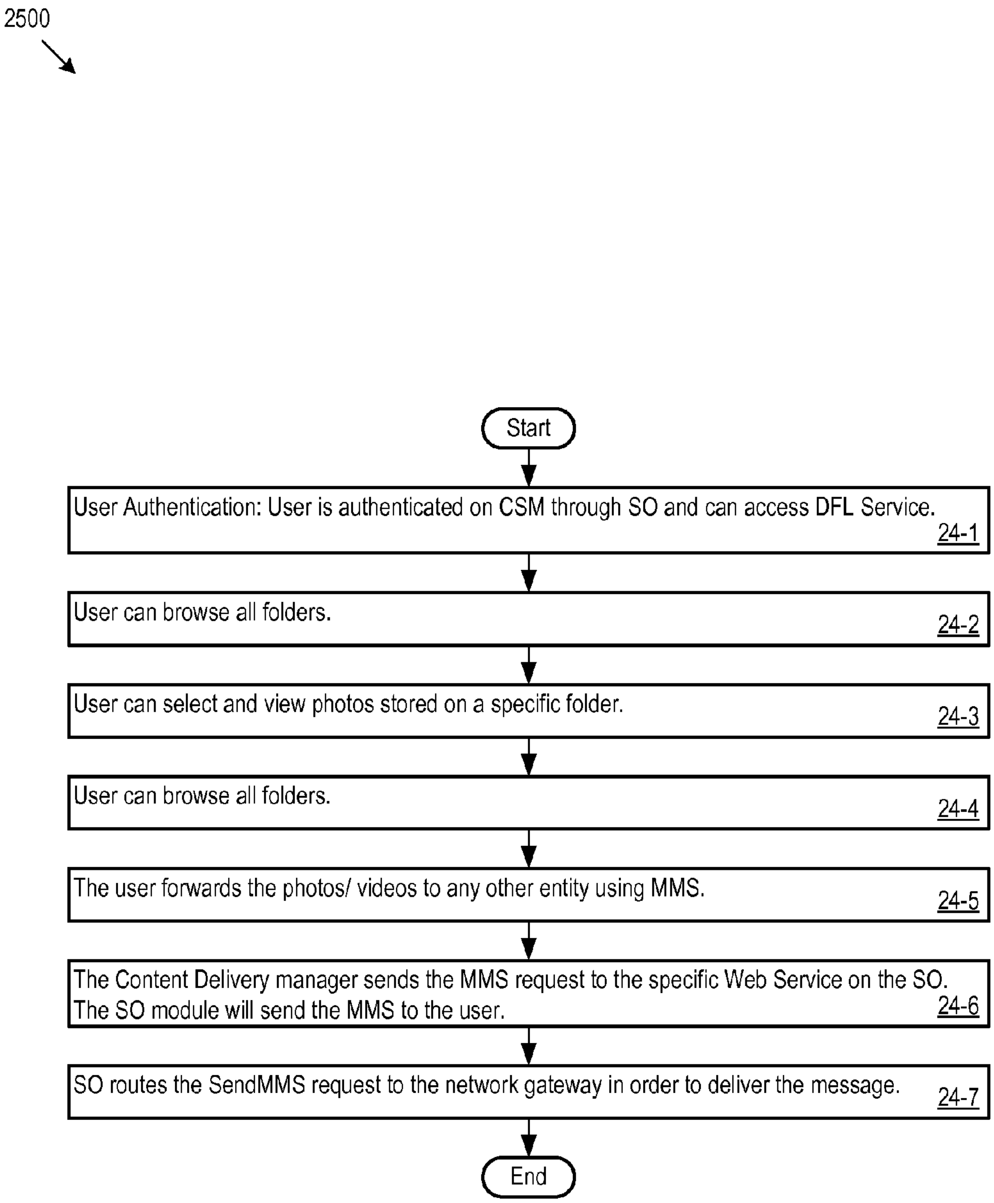
FIG. 25 shows a flow diagram for photo access logic.

FIG. 24 shows a hardware platform 2400 for photo access. FIG. 25 shows a flow diagram 2500 for photo access logic, with reference numbers back to FIG. 24. User Authentication: the subscriber is authenticated (e.g., based on a username/password) with CSM through the SO logic 826 and can access the DFL system (24-1). The subscriber may browse all folders (24-2). The subscriber may also select and view photos stored on a specific folder (24-3) and browse all folders within the specific folder (24-4). The subscriber may forward the photos/videos to any other entity using MMS (24-5). To that end, the delivery content manager 830 sends the MMS request to the specific Web Service on the SO logic 826 (24-6). The SO logic 826 sends the MMS to the user by routing a SendMMS request to the network gateway in order to deliver the message (24-7).

Figure 26:
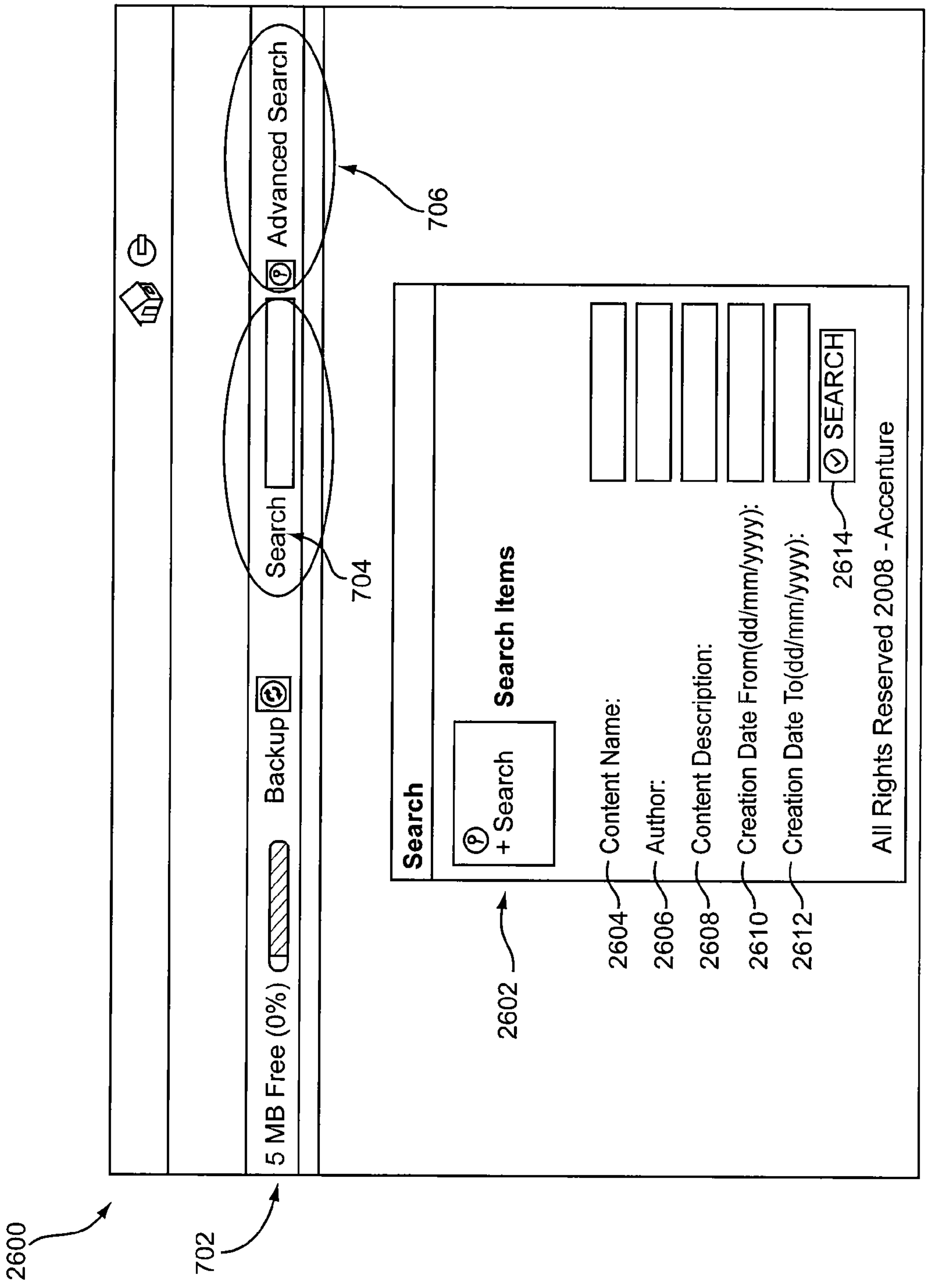
FIG. 26 shows a search interface for a digital file locker system.

FIG. 26 shows a search interface 2600 for a digital file locker system. The advanced search functionality 706 allows the subscriber to search content throughout all available DFLs. The basic search field 704 is present at the top of each interface screen page and may be based on filename searching, or any other search criteria. An advanced search interface 2602 is also shown. With the interface 2602, the subscriber may specify additional parameters. To that end, the interface 2602 includes a content name field 2604, an author search field 2606, a content description field 2608, a creation date From search field 2610, and a creation date To search field 2612. A search button 2614 initiates the search. Furthermore, at any time the subscriber may check remaining free space in the DFL, which the graphical space indicator 702 shows (e.g., as a percentage bar).

Figure 27:
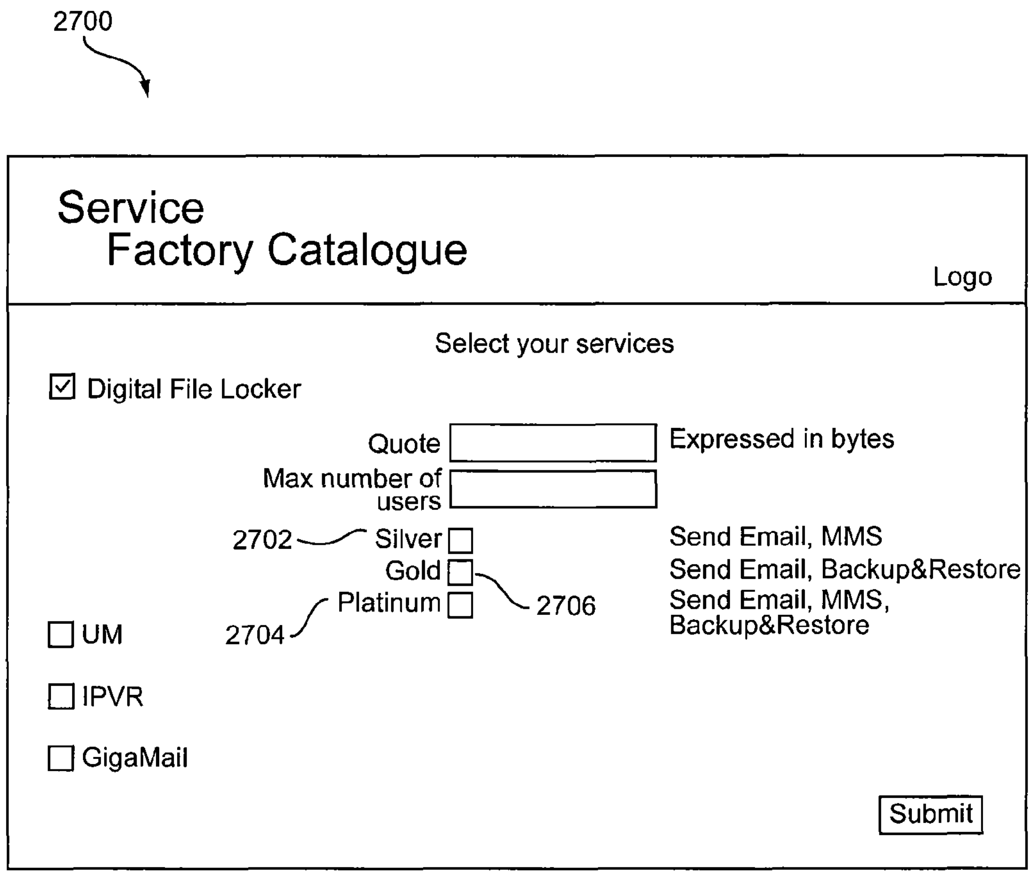
FIG. 27 shows an administrator interface for a digital file locker system.

FIG. 27 shows an administrator interface 2700 for administering DFL accounts and referred to as service factory catalogue access. A top level administrator accesses the service factory catalogue and may create an organization and a primary administrator. Either administrator may access the service factory catalogue and enter a user ID and password which are authenticated by the SDP. The interface 2700 displays the services provided by the system, such as sending email at the Silver level 2702, sending email and backup/restore at the Gold level 2704, and sending email, MMS messages, and backup/restore at the Platinum level 2706. The administrators use the interface 2700 to subscribe and configure a service (e.g., enter a disk quota in bytes, and specify the maximum number of users), and enter the subscriber data, including service credentials. The data entered by the administrators are stored in the CSM 828. The service activation for the subscriber is provisioned on supporting service platforms through the SO logic 826.

Figure 28:
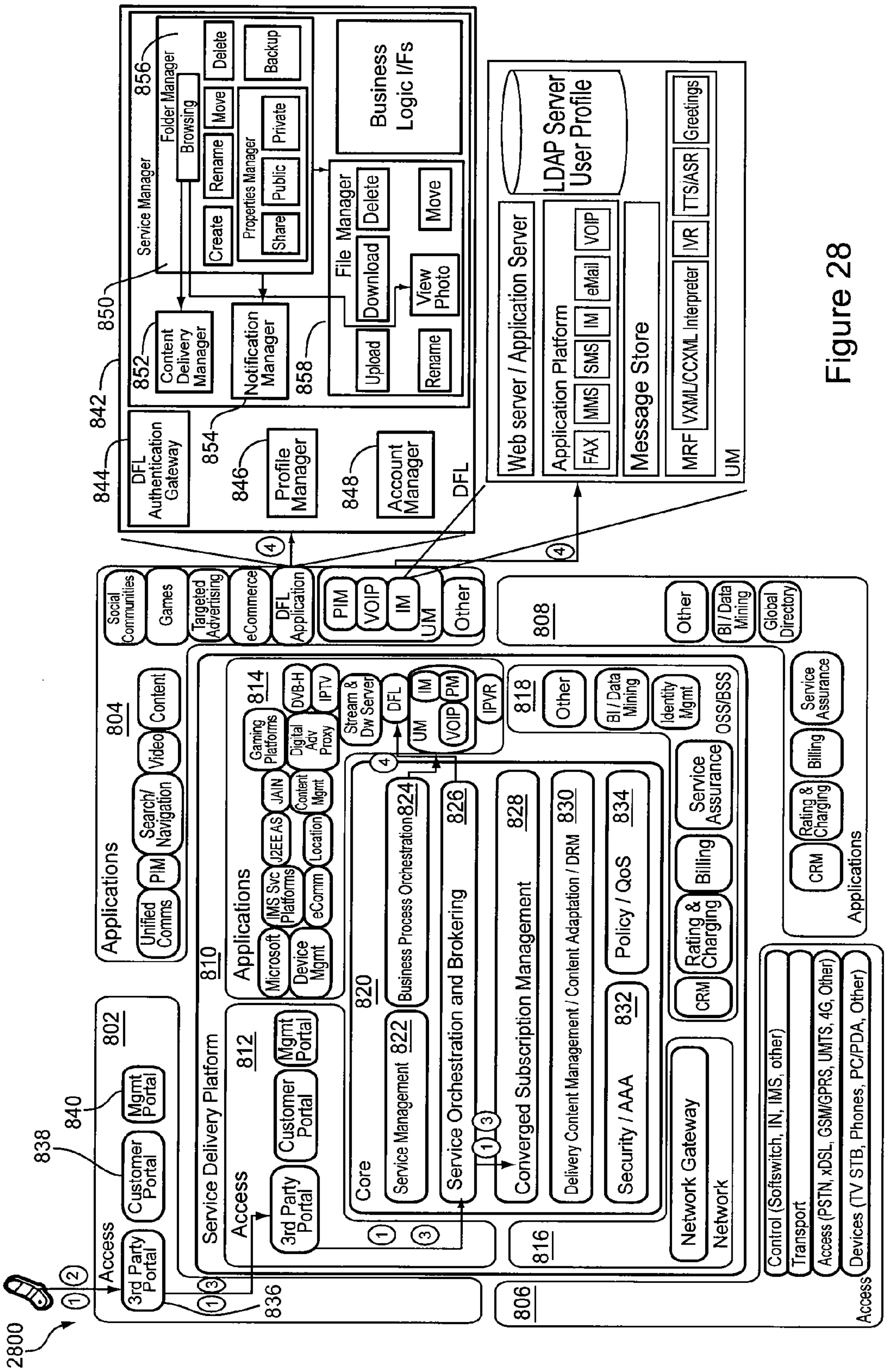
FIG. 28 shows a hardware platform for an administrative interface.
Figure 29:
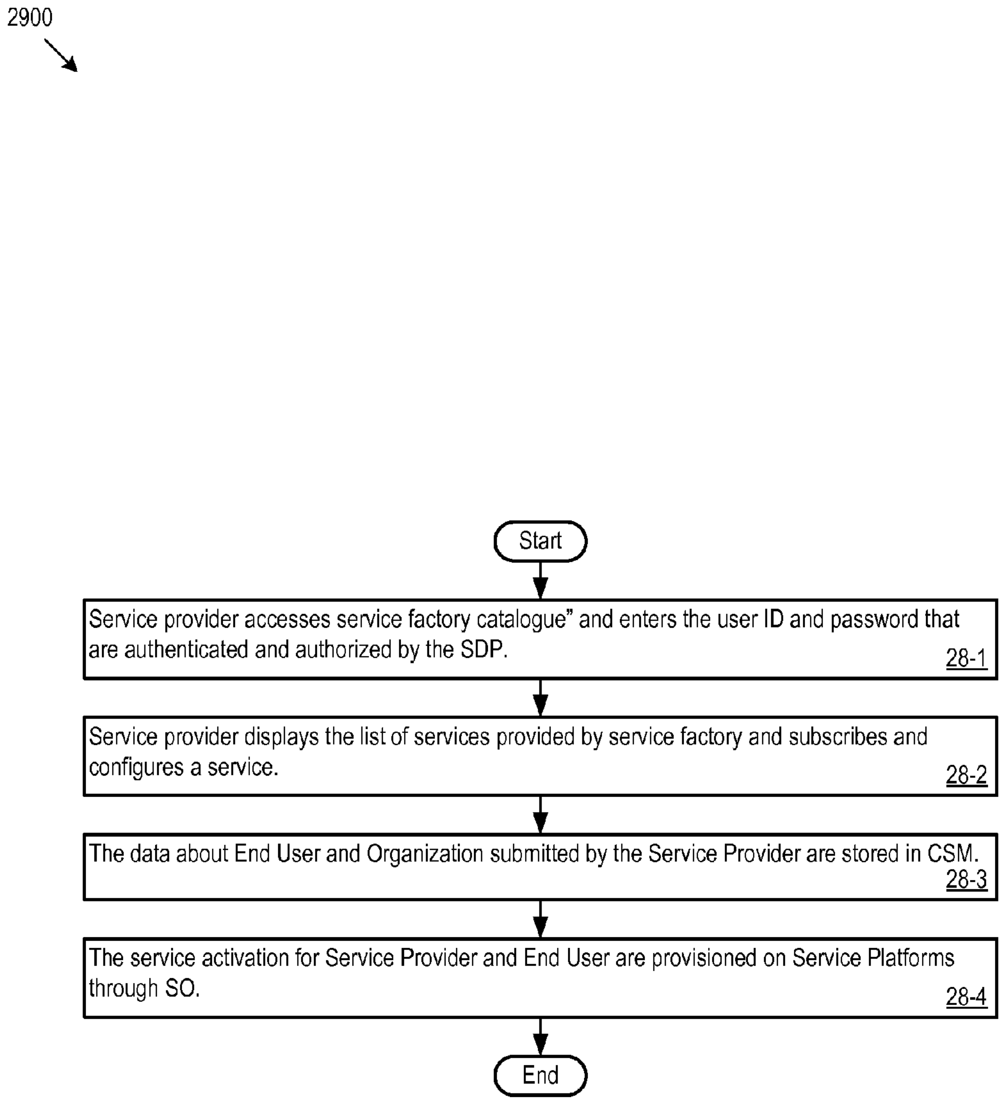
FIG. 29 shows a flow diagram for administration logic.

FIG. 28 shows a hardware platform 2800 for an administrative interface. FIG. 29 shows a flow diagram for administration logic, with reference numbers back to FIG. 28. The service provider accesses the service factory catalogue and enters the user ID and password that are authenticated and authorized by the SDP (28-1). The interface 2700 displays the list of services provided by the service factory and the administrator may subscribe and configure DFL services (28-2). The data about the subscriber and organization submitted by the administrator are stored in the CSM 828 (28-3). Also, the service activation for the service provider and the subscriber are provisioned on service platforms under coordination of the SO logic 826 (28-4).

Figure 30:
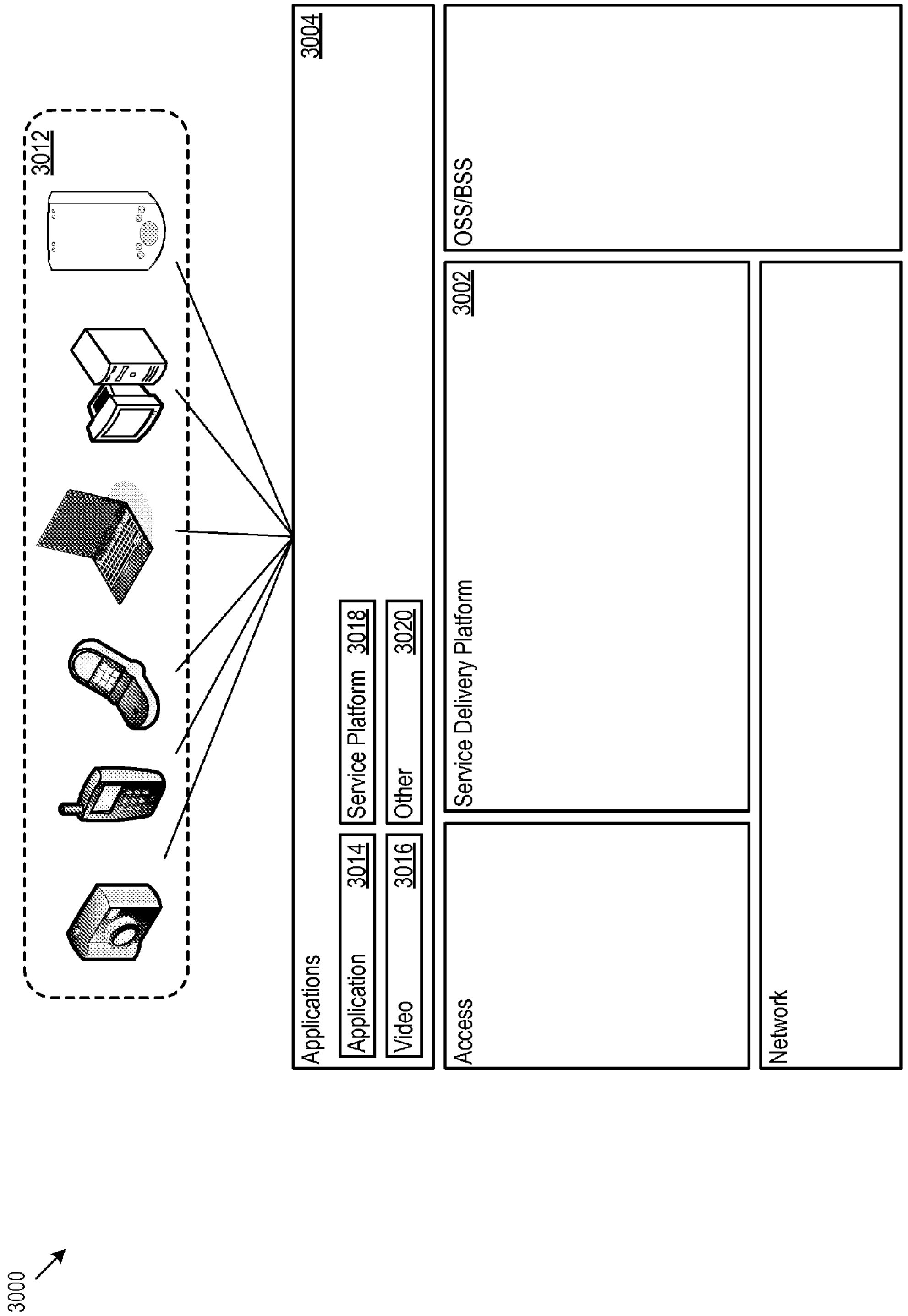
FIG. 30 shows a multi-channel content modeling system.

FIG. 30 shows a multi-channel content modeling system 3000 for delivering custom catalogues and custom content. The multi-channel content modeling system 300 includes a Service Delivery Platform (SDP) 3002 and an applications layer 3004. The applications layer 3004 may include application logic 3014, video logic 3016, service platform logic 3018, and other logic 3020. The application logic 3014, video logic 3016, service platform logic 3018, and other logic 3020 may communicate with logic in the SDP 3002. The applications layer 3004 may communicate with one or more of subscriber devices 3012. An example multi-channel content modeling system is presented in more detail with respect to FIG. 39.

Figure 31:
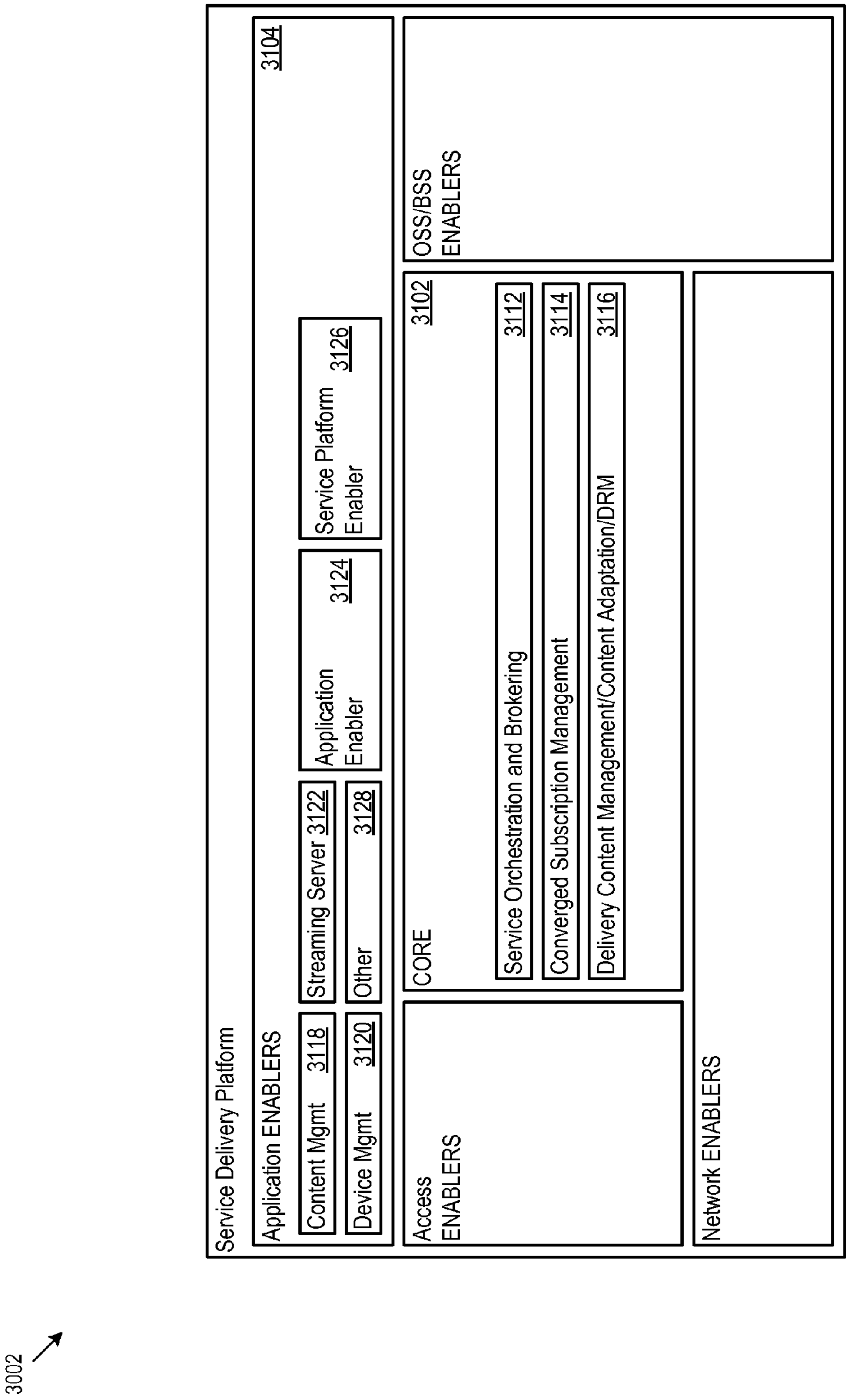
FIG. 31 shows a service delivery platform.

FIG. 31 shows an example implementation of a service delivery platform (SDP) 3002 for requesting and delivering custom catalogues and custom content. The SDP 3002 includes core logic 3102 and an application enabler layer 3104. The core logic 3102 includes service orchestration and brokering logic 3112, converged subscription management (CSM) logic 3114, and delivery content management (DCM)/content adaptation (CA)/digital rights management (DRM) (DCD) logic 3116. The service orchestration and brokering logic 3112 may enable communication between different logics and layers within the SDP 3002 and facilitate the execution of processes by the SDP 3002. The CSM logic 3114 may enable storage and retrieval of subscriber profile information. The DCD logic 3116 may enable access to media or multimedia content.

The application enabler layer 3104 includes content management logic 3118, device management logic 3120, streaming server logic 3122, application enabler logic 3124, service platform enabler logic 3126, and other logic 3128. The content management logic 3118 may communicate with the service orchestration and brokering logic 3112, and the device management logic 3120, streaming server logic 3122, application enabler logic 3124, service platform enabler logic 3126, and other logic 3128 may communicate with logic in an application layer.

The device management logic 3120 may channel communication between the logics of the SDP 3002 and a device manager. The streaming server logic 3122 may channel communication between the logics of the SDP 3002 and a streaming client. The application enabler logic 3124 may channel communication between the logics of the SDP 3002 and an application enabler. The service platform enabler logic 3126 may channel communication between the logics of the SDP 3002 and a service platform.

Figure 32:
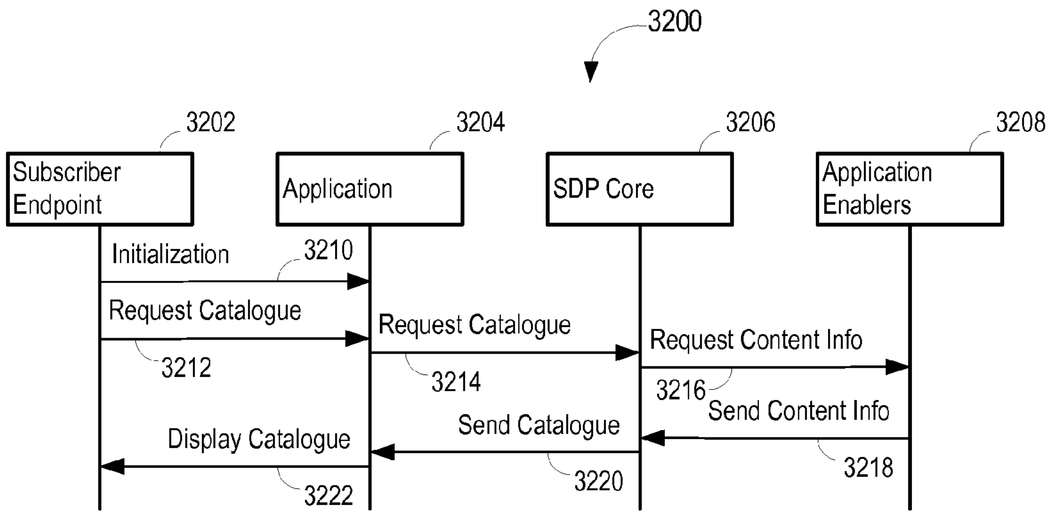
FIG. 32 shows a content catalogue request flow.

FIG. 32 shows a flow 3200 for requesting and receiving a content catalogue. The flow 3200 shows the entities interacting with respect to content catalogue request and reception, as well as the messages communicated between the entities. A subscriber endpoint 3202 sends an initialization request to an application 3204 (3210). The subscriber endpoint 3202 may be a subscriber device, such as a laptop, desktop, or notebook computer, a mobile phone or mobile device, a personal digital assistant (PDA), a hand-held device, or any other communication and processing device. The application 3204 may be software resident on the subscriber device or it may be application logic 3014 resident in an application layer 3004.

The initialization request may include subscriber login or registration information such as a username and a password or other information. The subscriber endpoint 3202 requests a custom content catalogue from the application 3204 (3212). The request may be automatically included by the subscriber endpoint 3202 as part of the initialization request 3210. Alternatively or additionally, the request may be initiated by a user of the subscriber endpoint 3202 through a user interface running on the subscriber endpoint 3202.

The application layer 3204 processes the initialization request and sends a catalogue request to the core logic 3206 in the SDP 3206 (3214). The catalogue request may include subscriber identification information and/or channel identification information. Subscriber identification information may identify a SDP account associated with a particular subscriber and/or a subscriber profile. For example, the subscriber identification information may include a username, such as "john green". Channel identification information may identify a device and/or a communication or processing capability of a device that is associated with a subscriber. The communication capability may include communication bandwidth or a connection type, such as broadband, dial-up, or cellular broadband. The processing capability may include processor speed, memory, display size, display resolution, sound capability, or available video or audio codecs. For example, the channel identification information may be the value "2", where "2" corresponds to a mobile device running Symbian™ as an operating system.

The core logic 3206 processes the request and sends a content information request to an application enabler layer 3208 (3216). The application enabler layer 3208 may be the application enabler layer 3104. The content information request may include segment identification information and/or channel identification information. The segment identification information may identify a subject of interest from which media or multimedia content may be selected. For example, the segment identification information may be the value "3", where "3" corresponds to "Music". The core logic 3206 may obtain the segment identification information in a manner described with respect to FIG. 33. The core logic 3206 may obtain channel identification information from a catalogue request from the application layer 3204.

The application enabler layer 3208 processes the request and returns content information to the core logic 3206 (3218). The application enabler layer 3208 may access entertainment content management logic, such as the ECM presented with respect to FIG. 33, or it may access a database for the content information. The content information may include listings of available media or multimedia content that are tailored to a specific subscriber. The content information may include one or more entries or lists of entries for a subscriber-specific catalogue. The content information may include a content identifier and/or a corresponding content title. For example, the content information may have a content identifier with a value of "0900000180003211" that corresponds to downloadable video content with a title of "Tiger Woods Drowned Clubs Advertisement".

The core logic 3206 processes the content information and sends catalogue information to the application layer 3204 (3220). The core logic 3206 may parse the content information and reformat the content information into a catalogue bundle, such as an XML file. The core logic 3206 may put wrappers on fields. The catalogue information may include parse-able data reflecting media or multimedia content tailored to a specific subscriber that may be displayed in an orderly presentation. For example, the catalogue information may be an extensible mark-up language (XML) file including subscriber-specific catalogue information, subscription identification information, and service capability information. A catalogue bundle (described in more detail below) may include this XML file.

The application layer 3204 processes the catalogue information and sends the catalogue information to the subscriber endpoint 3202 for display (3222). The application layer 3204 may parse the catalogue information and reformat the catalogue information into data compatible with software on the subscriber endpoint 3202. For example, the application layer 3204 may reformat catalogue information from an XML file into HTML table data for display on a web browser residing on the subscriber endpoint 3202. Alternatively, the catalogue information may be reformatted into data compatible with proprietary software on the subscriber endpoint 3202.

Figure 33:
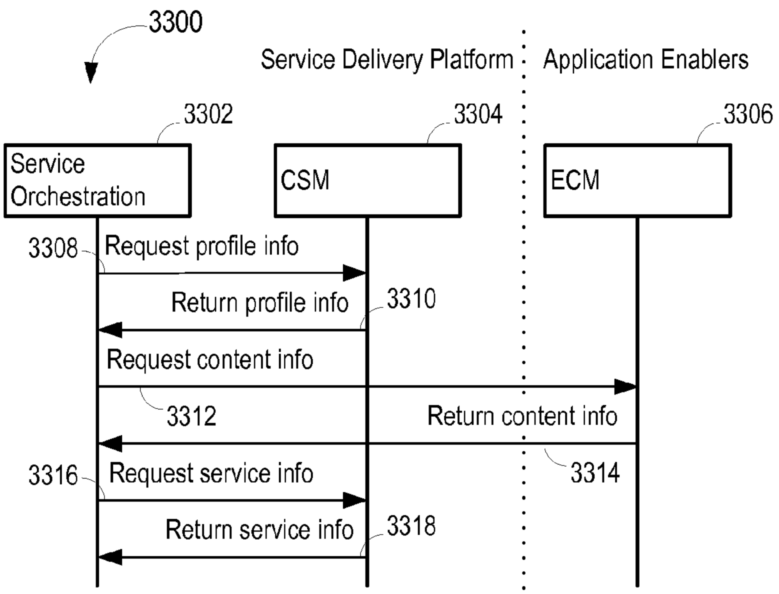
FIG. 33 shows a subscriber-specific catalogue content request flow.

FIG. 33 shows a flow 3300 for requesting subscriber-specific catalogue content. The flow 3300 may further describe the interaction between the core logic 3206 and the application enabler layer 3208 in actions 3216 and 3218 in FIG. 32. Service orchestration logic 3302 sends a request for profile information to converged subscription management (CSM) logic 3304 (3308). The service orchestration and brokering logic 3112 may include the service orchestration logic 3302. The request may include a username or other subscriber or account identification information.

The CSM logic 3304 processes the request and returns profile information (3310). The CSM logic 3304 may search a database with the username or other subscriber or account identification information from the request for corresponding profile information. The profile information may contain subscriber segment information for a subscriber. The subscriber segment information may include interest category information or other subscriber-indicated or targeted advertising-oriented information. For example, the profile information may include an interest category value of "3", which corresponds to a subscriber-indicated interest in "Music".

The service orchestration logic 3302 processes the profile information and requests content information from an entertainment content management (ECM) logic or content management logic 3306 (3312). The service orchestration logic 3302 may parse the interest category information from the profile information and include the interest category information in the content information request from the ECM. The content information request may include segment identification information and/or channel identification information. The segment identification information may identify a subject of interest from which media or multimedia content may be selected. The segment identification information may be the interest category information. The channel identification information may identify a device and/or a communication or processing capability of a device that is associated with a subscriber.

The ECM logic 3306 processes the content request and returns content information. The ECM logic 3306 may parse the content request and search a database with segment identification information and/or channel identification information for associated content information. The catalogue information may be content information and may include listings of available media or multimedia content that are tailored to a specific subscriber, device, and/or communication or processing capability. The content information may be entries for a subscriber-specific catalogue. The content information may include a content identifier and/or a corresponding content title.

The service orchestration logic 3302 requests service information from the CSM logic 3304 (3316). The request 3316 may include a username or other subscriber or account identification information. The request 3316 may occur before, concurrently with, or after the request 3308.

The CSM logic 3304 processes the request and returns service information (3318). The service information may include subscription identification information that identifies a subscription service to which the subscriber has access. The service information may include service capability information that identifies subscription actions associated with the subscription service to which the subscriber has access. For example, the service information may be a subscription identifier with a value of "5", where "5" indicates that the subscriber has access to a digital file locker, and a service capability identifier with a value of "3", where "3" corresponds to a download action capability for the subscriber's digital file locker access.

Figure 34:
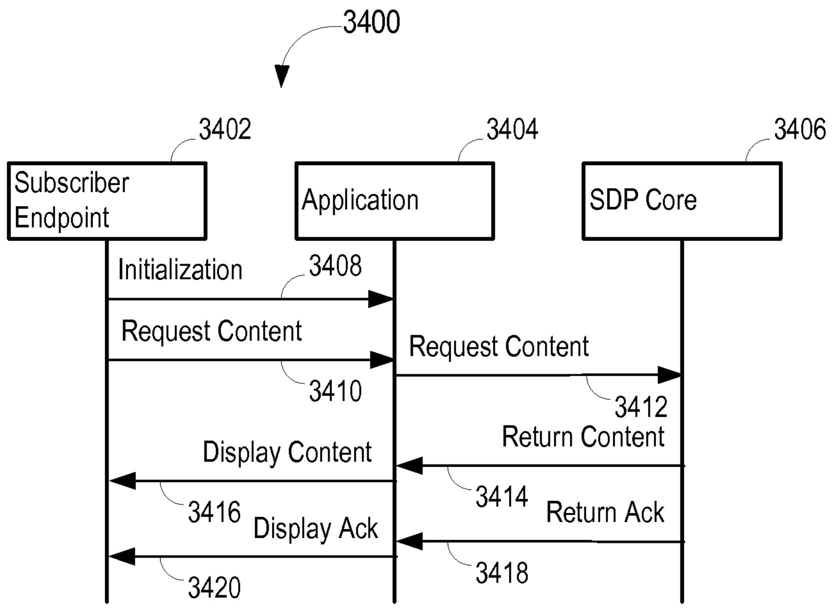
FIG. 34 shows a content request flow.

FIG. 34 shows a flow 3400 for a content request. A subscriber endpoint 3402 sends an initialization request to an application layer 3404 (3408). The initialization request may be similar to the initialization request 3210 in FIG. 32.

The subscriber endpoint 3402 requests content from the application layer 3404 (3410). The request may be made by a user on a subscriber device selecting information representing a catalogue entry from a catalogue listing displayed on the subscriber device. The application layer 3404 processes the request and sends a content request to core logic 3406 in a service delivery platform (SDP). The content request may include a content identifier, subscriber identification information, subscription identification information, and service capability information. For example, a request may include a content identifier with a value of "090000018000321l", subscriber identification information with a value of "john green", subscription identification with a value of "5", and service capability identification with a value of "3".

The core logic 3406 processes the content request and returns the requested content (3414). The core logic 3406 may parse the content request for a content identifier, subscriber identification information, subscription identification information, and/or service capability information. The core logic 3406 may search a database with the parsed information to obtain corresponding content information that the core logic 3406 may return as the requested content. The requested content may be downloaded to the application 3404. The requested content may be streamed to the application layer 3404. The application layer 3404 processes the requested content and sends the processed content to the subscriber endpoint 3402 for display (3420).

Alternatively, the core logic 3406 processes the content request and returns an acknowledgement (3418). The core logic 3406 may search a database with information parsed from the content request to obtain corresponding content information on which the core logic 3406 may perform further processing, such as file copying to a shared network drive or uploading to a Web 2.0 repository or digital file locker. The core logic 3406 may return an acknowledgement instead of the requested content when the service capability identification value indicates that the indicated action does not require sending content. For example, an acknowledgement may be sent where the action indicates uploading of content to a digital file locker. The application layer 3404 processes the acknowledgement and may optionally send the acknowledgement to the subscriber endpoint 3402 for display (3420).

Figure 35:
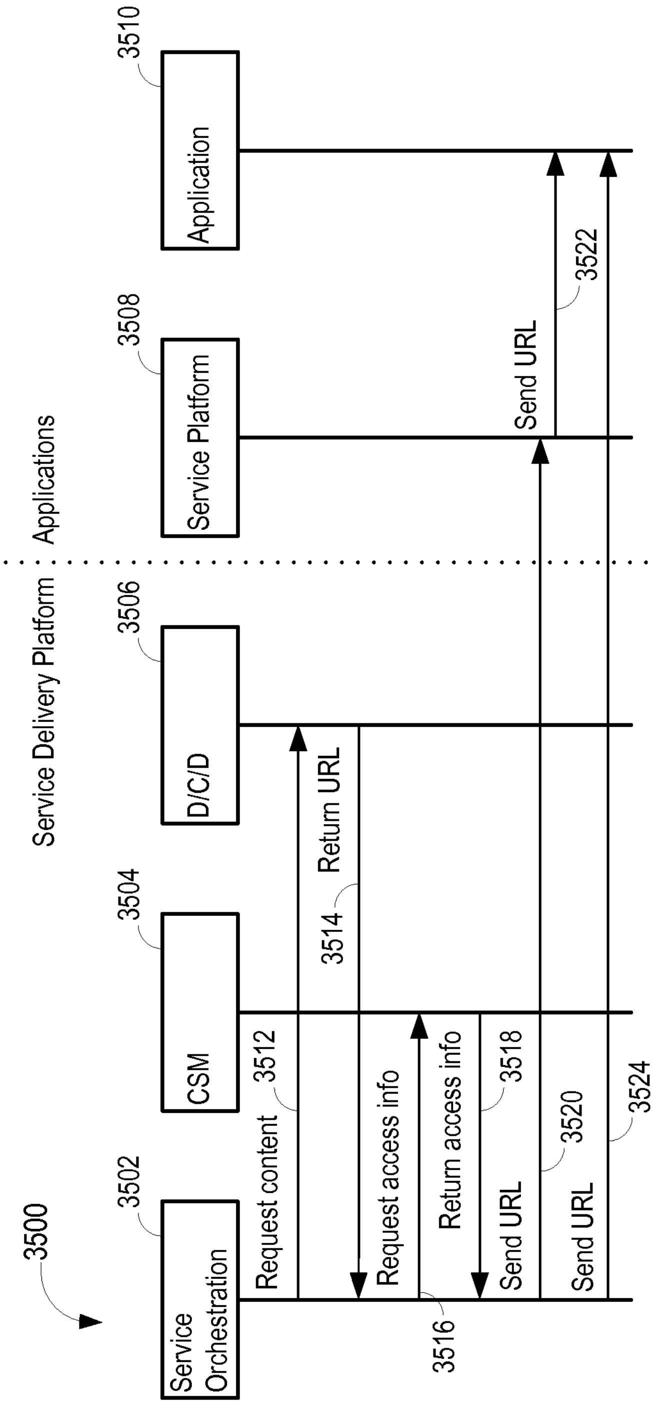
FIG. 35 shows a content retrieval flow.

FIG. 35 shows a flow 3500 for content retrieval. Service orchestration logic 3502 sends a content request to a delivery content management (DCM)/content adaptation (CA)/digital rights management (DRM) (DCD) logic 3506 (3512). The content request may include content identification information, subscription identification information, and service capability information. The DCD logic 3506 processes the request and returns a uniform resource locator (URL) (3514). The DCD logic 3506 may parse the content request and search a database with information from the parsed request to obtain a corresponding URL. The URL may identify a location where media or multimedia content is stored and accessible.

The service orchestration logic 3502 sends to converged subscription management (CSM) logic 3504 a request for access information (3516). The request may include subscription and/or account information and subscription identification information. The request 3516 may occur before, concurrently with, or after the request 3512.

The CSM logic 3504 processes the access information request and returns the requested access information (3518). The CSM logic 3504 may parse the access information request and search a database using the parsed information to obtain the access information. The CSM logic 3504 use the account information to determine whether a subscriber has access to a subscription service identified by the subscription information. For example, the CSM logic 3504 may determine whether the username "john green" has access to a digital file locker service. The CSM logic 3504 may return access information including an access parameter. For example, username "john green" may have access to a digital file locker subscription where the access parameter is a digital file locker subscription username of "jgreen".

The service orchestration logic 3502 processes and sends the URL and access information to service platform logic 3508 (3520). The service orchestration logic 3502 may parse the URL and reformat the URL, such as by including it in a wrapper, before sending the URL. The service platform logic 3508 accesses a user service platform or other service platform using the access information. The service platform logic 3508 may cause the user service platform to access the content located at the URL. For example, the service platform may upload the content at the URL for storage. The user service platform may be a digital file locker service, a Web 2.0 repository, a shared directory, or other mass or network storage facility. The user service platform 3508 may optionally notify an application layer 3510 of the location of the stored content (3522). The application layer 3510 may then access the content located at the stored location. The location of the stored content may be identified by another URL. Alternatively, the service orchestration logic 3502 may send the URL and access information directly to an application layer 3510 (3524). The application layer 3510 may then use the URL and access information to access the content at the URL.

Figure 36:
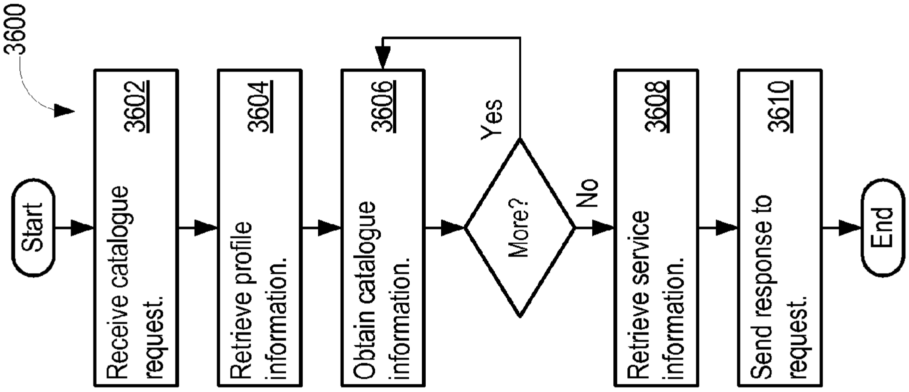
FIG. 36 shows a flow diagram for content catalogue request and retrieval in system core logic.

FIG. 36 shows a flow diagram 3600 for requesting and retrieving a content catalogue that may be performed by system core logic, such as system core logic 3206. The system core logic receives a request for a catalogue (3602). The catalogue request may include subscriber identification information and/or channel identification information. The system core logic retrieves profile information (3604). The profile information may contain subscriber segment information for a subscriber identified by the subscriber information.

The system core logic obtains catalogue information (3606). The system core logic may use the segment identification information and/or channel identification information to obtain the catalogue information. The catalogue information may be content information and may include listings of available media or multimedia content that are tailored to a specific subscriber, device, and/or communication or processing capability. The content information may be entries for a subscriber-specific catalogue. The content information may include a content identifier and/or a corresponding content title. The catalogue information may be delivered in obtained in one bundle, or it may be obtained sequentially or in multiple bundles. Where the catalogue information is obtained in multiple bundles, the system core logic may wait to receive all of the bundles before further processing occurs.

The system core logic retrieves service information (3608). The logic may use a username or other subscriber or account identification information to retrieve the service information. The service information may be service variant information representing subscription and/or account details. The service information may include subscription identification information that identifies a subscription service to which the subscriber has access. The service information may include service capability information that identifies subscription actions associated with the subscription service to which the subscriber has access. The retrieval 3608 may occur before, concurrently with, or after the retrieval 3604.

The system core logic sends a response to the catalogue request (3610). The response may include parse-able data reflecting media or multimedia content tailored to a specific subscriber that may be displayed in an orderly presentation. For example, the response may be an extensible mark-up language (XML) file including subscriber-specific catalogue information, subscription identification information, and service capability information.

Figure 37:
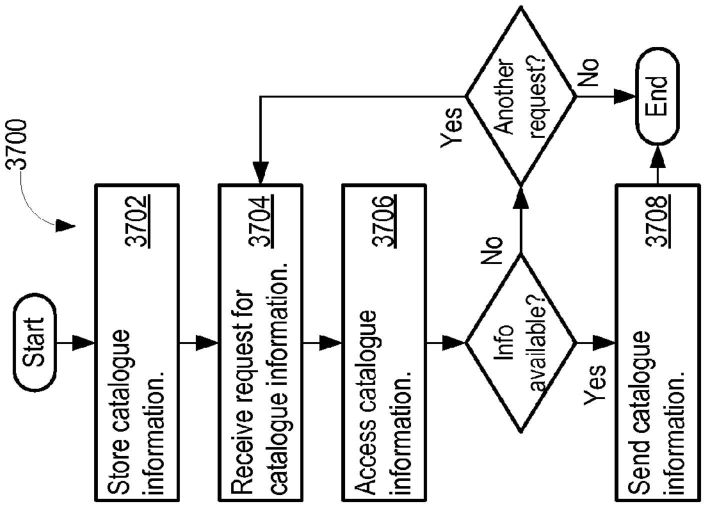
FIG. 37 shows a flow diagram for application enabler logic.

FIG. 37 shows a flow diagram 3700 for sending catalogue information that may be performed by application enabler logic, such as application enabler logic 3208. Application enabler logic may store catalogue information (3702). The catalogue information may include content entries with content information that may include media or multimedia content. The content entries may include data that indicate that the media or multimedia content may be accessed by a device and/or communication or processing capability. The content entries may include data that indicate a subscriber segment with which the media or multimedia content identifies. The content information may include a content identifier and/or a corresponding content title.

The application enabler logic may receive a request for catalogue information (3704). The request may include segment identification information and/or channel identification information. The segment identification information may identify a subject of interest from which media or multimedia content may be selected. The channel identification information may identify a device and/or a communication or processing capability of a device that is associated with a subscriber.

The application enabler logic may access the catalogue information (3706). For example, the application enabler logic may search the catalogue information for content entries that match with the segment identification information and/or channel identification information. If no such content entries match, then the application enabler logic may determine whether another catalogue information request is available for processing. If another request is available, then the application enabler logic receives the request. Otherwise the process terminates. If content entries match the request, then the application enabler logic processes the matching content entries and sends the processed entries as catalogue information (3708). The catalogue information may include a content identifier and/or a corresponding content title.

Figure 38:
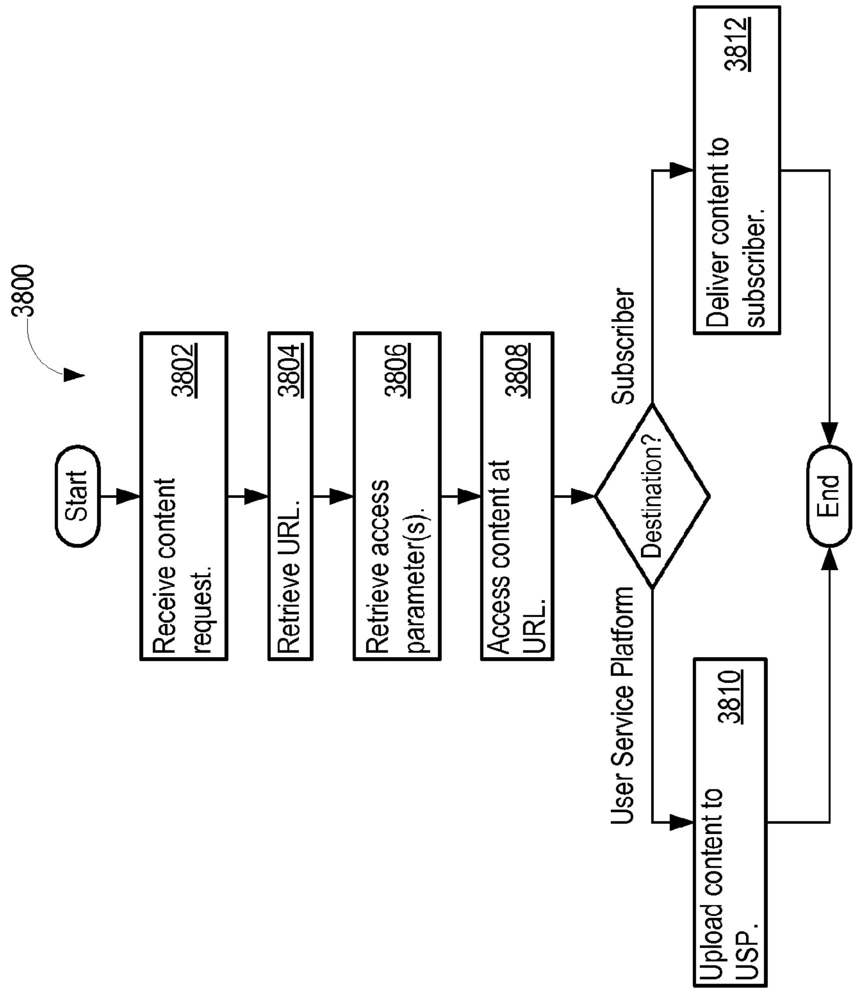
FIG. 38 shows a flow diagram for content request and retrieval in system core logic.

FIG. 38 shows a flow diagram 3800 for requesting and retrieving content that may be performed by system core logic, such as system core logic 3206. The system core logic receives a content request (3802). The content request may include a content identifier, subscriber identification information, subscription identification information, and service capability information.

The system core logic retrieves a URL (3804). The system core logic may use content identification information, subscription identification information, and service capability information to retrieve the URL. The URL may identify a location where media or multimedia content is stored and accessible.

The system core logic retrieves an access parameter (3806). The system core logic may use subscription and/or account information and subscription identification information to retrieve the access parameter. The retrieval 3806 may occur before, concurrently with, or after the retrieval 3804.

The system core logic accesses content at the URL (3808). The system core logic may use the access parameter and the URL to access the content. The system core logic may then either upload the content to a user service platform (3810) or deliver the content directly to an application layer, subscriber endpoint, subscriber device, or subscriber (3812). The user service platform may be a digital file locker service, a Web 2.0 repository, a shared directory, or other mass or network storage facility.

Figure 39:
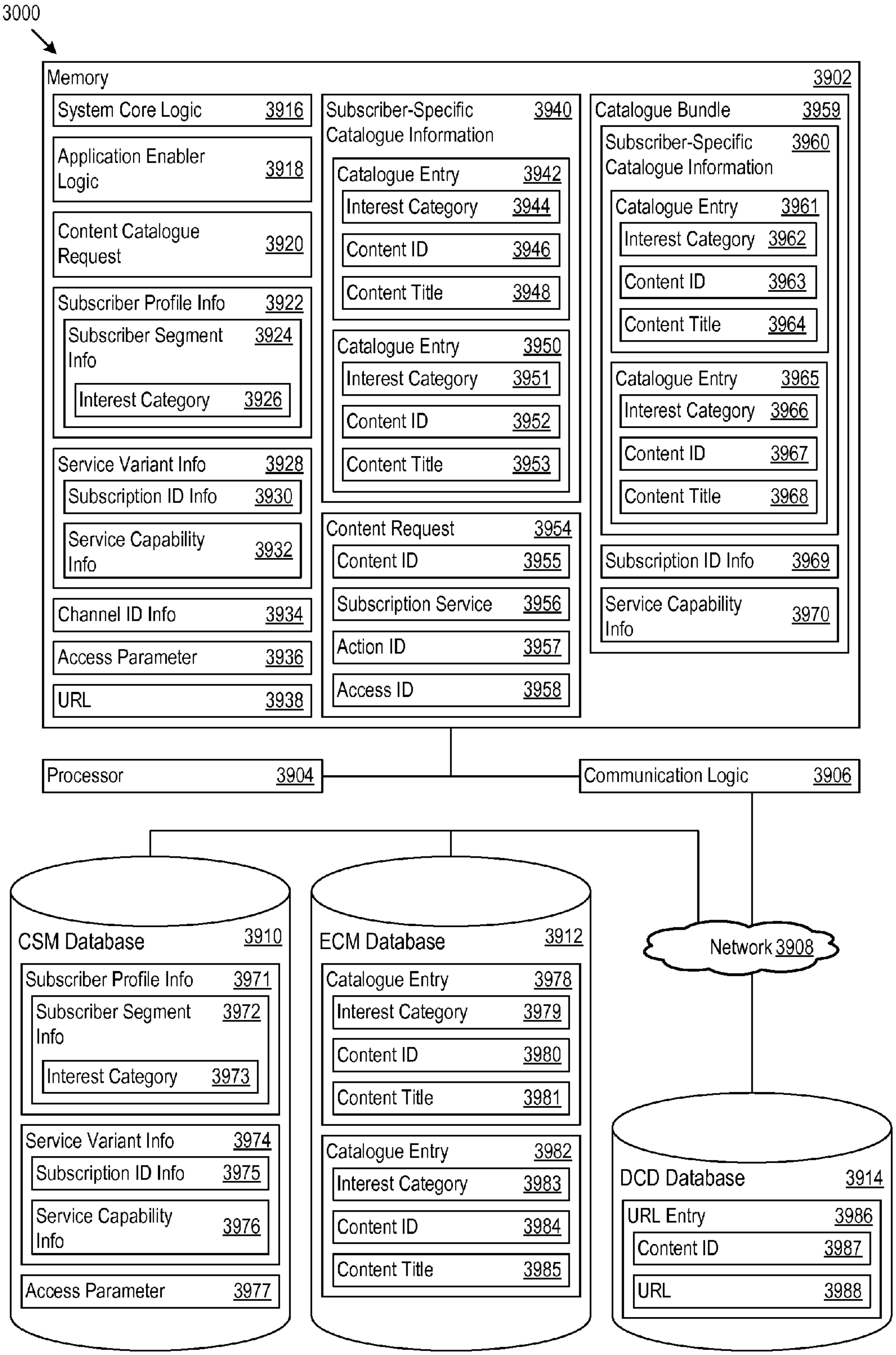
FIG. 39 shows an example implementation of a multi-channel content modeling system.

FIG. 39 shows an example implementation of a multi-channel content modeling system 3000. The system 3000 includes a memory 3902, a processor 3904, and communication logic 3906. The communication logic 3609 may communicate with a network 3908. Databases 3910, 3912, and 3914 may be connected to the network 3908 and accessible to the memory 3902 and processor 3904 through the communication logic 3906.

The memory 3902 includes system core logic 3916, application enabler logic 3918, a content catalogue request 3920, subscriber profile information 3922, service variant information 3928, channel identification information 3934, an access parameter 3936, a URL 3938, subscriber-specific catalogue information 3940, a content request 3954, and a catalogue bundle 3959. The subscriber profile information 3922 may include subscriber segment 3924, which in turn may include interest category information 3926. The service variant information 3928 may include subscription identification information 3930 and service capability information 3932.

The subscriber-specific catalogue information 3940 may include catalogue entries 3942 and 3950. Each catalogue entry may include interest category information 3944, 3951, content identification information 3946, 3952, and a content title 3948, 3953. The content request 3954 may include content identification information 3955, subscription service information 3956, action identification information 3957, and access identification information 3958.

The catalogue bundle 3959 may include subscriber-specific catalogue information 3960, subscription identification information 3969, and service capability information 3970. The subscriber-specific catalogue information 3960 may include catalogue entries 3961 and 3965. Each catalogue entry may include interest category information 3962, 3966, content identification information 3963, 3967, and a content title 3964, 3968. The information in the catalogue bundle may be parsed by the processor and used to customize a catalogue display for a subscriber. For example, the catalogue display may include a table listing the interest category information 3962, 3966, content identification information 3963, 3967, and a content title 3964, 3968. The table may also include the subscription identification information to identify which services are available for a given content title. The table may also include the service capability information for a given subscription service. For example, the table may include the entry: "Sports, 0900000180003211, Tiger Woods Drowned Clubs Advertisement, digital file locker, upload." That entry may indicate the subscriber interest of "Sports", a content identifier of "0900000180003211", a content title of "Tiger Woods Drowned Clubs Advertisement", a subscription identifier of "digital file locker", and a subscription service capability action of "upload".

The CSM database 3910 includes subscriber profile information 3971, service variant information 3974, and an access parameter 3977. The subscriber profile information 3971 may include subscriber segment 3972, which in turn may include interest category information 3973. The service variant information 3974 may include subscription identification information 3975 and service capability information 3976. The ECM database 3912 includes catalogue entries 3978, 3982. Each catalogue entry may include interest category information 3979, 3983, content identification information 3980, 3984, and a content title 3981, 3985. The DCD database 3914 includes a URL entry 3986 that further includes content identification information 3987 and a URL 3988. The databases 3910, 3912, and 3914 may be implemented as a single database or multiple databases.

Figure 40:
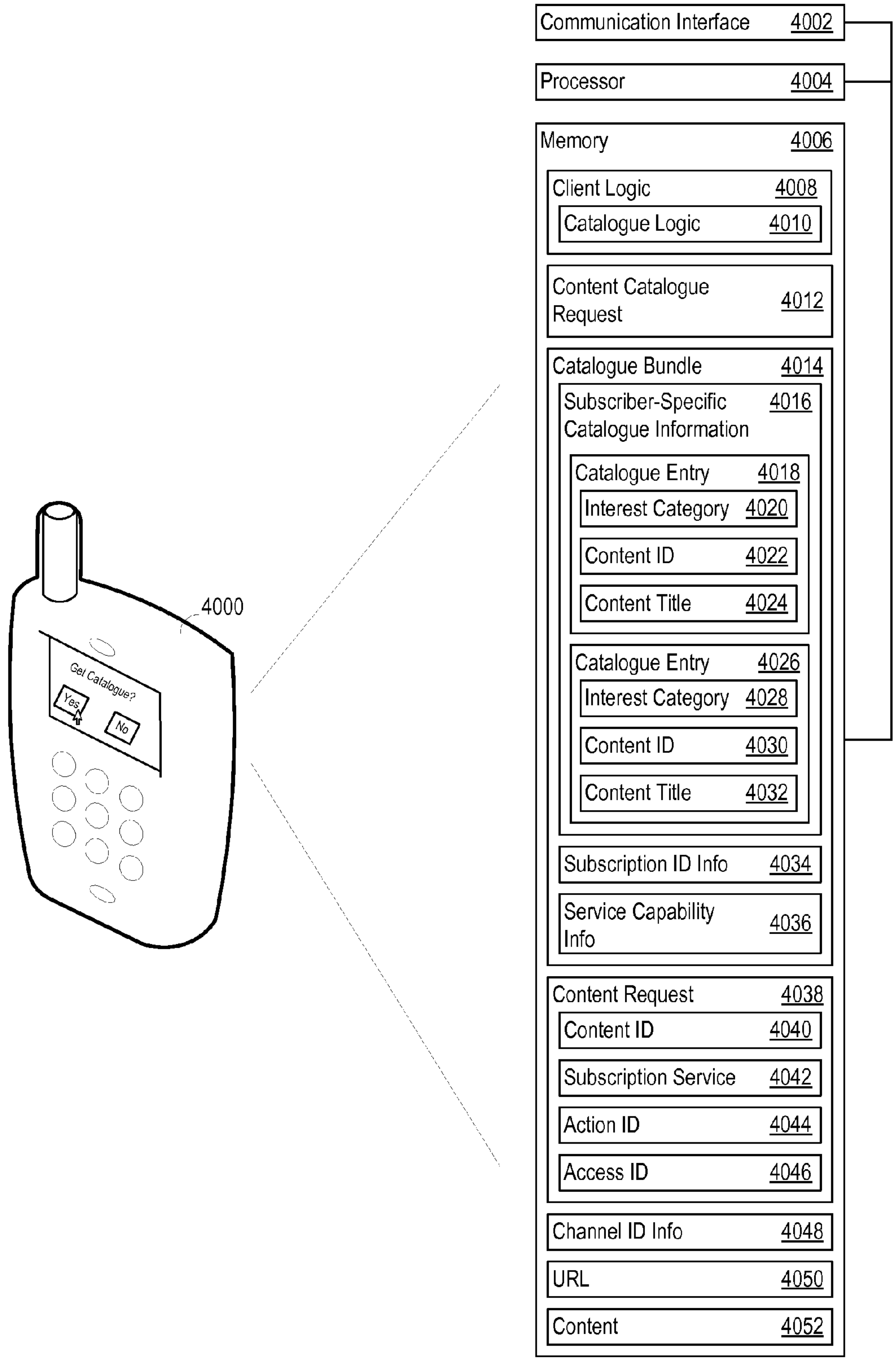
FIG. 40 shows a subscriber device.

FIG. 40 shows a subscriber device 4000. The subscriber device includes a communication interface 4002, a processor 4004, and a memory 4006. The memory 4006 includes client logic 4008, a content catalogue request 4012, a catalogue bundle 4014, a content request 4038, channel identification information 4048, a URL 4050, and content information 4052. The client logic may include catalogue logic 4010 that processes catalogue information for display. The catalogue bundle 4014 may include subscriber-specific catalogue information 4016, subscription identification information 4034, and service capability information 4036.

The subscriber-specific catalogue information 4014 may include catalogue entries 4018, 4026. Each catalogue entry may include interest category information 4020, 4028, content identification information 4022, 4030, and a content title 4024, 4032. The content request 4038 may include content identification information 4040, subscription service information 4042, action identification information 4044, and access identification information 4046.

Figure 41:
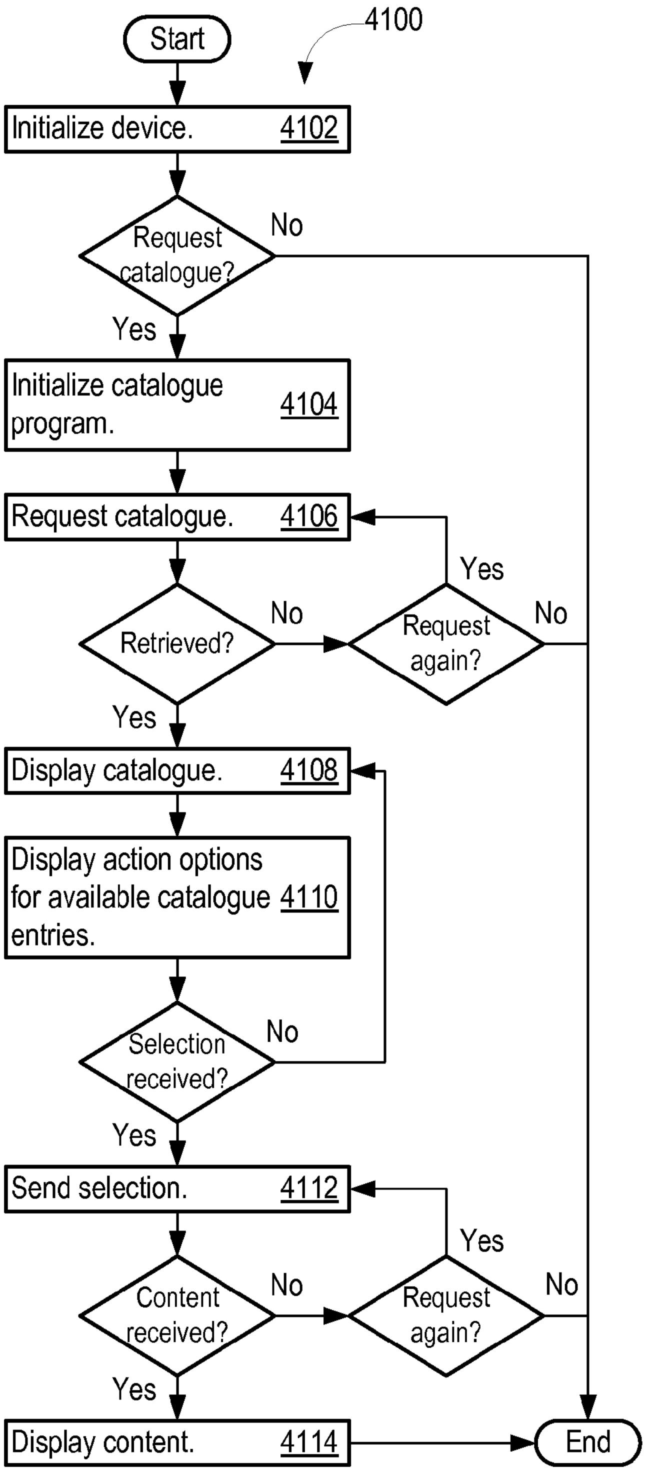
FIG. 41 shows a flow diagram for client logic on a subscriber device.

FIG. 41 shows a flow diagram 4100 for requesting and receiving a catalogue and media or multimedia content from the catalogue that may be performed by client logic, such as client logic 4008, on a subscriber device. The client logic may initialize the subscriber device (4102). The initialization may include registering the device with a service delivery platform (SDP). If the client logic decides to request a catalogue, the client logic initializes a catalogue program or application (4104). Otherwise the client logic may terminate further processing. The initialization may include loading an application onto the subscriber device. The catalogue application may interface with a subscriber through catalogue logic.

The client logic may request a catalogue (4106). The request may be transmitted to a SDP. If a response to the request is not received within a period of time, the client logic may attempt to request the catalogue again. Otherwise the client logic may terminate further processing. When a response to the request is received, the client logic may process the response. The client logic may then display the processed response information in the form of a catalogue display (4108). The client logic may use catalogue logic to process and/or display the response information.

The client logic and/or catalogue logic may display action options that may be available for displayed catalogue entries (4110). If the client logic and/or catalogue logic does not receive a selected action for a displayed catalogue entry, the client logic and/or catalogue logic may continue to display the catalogue along with the action options. When the client logic and/or catalogue logic receives an action selection, the logic sends the selection along with content identification information to the SDP (4112).

If the logic does not receive a response, the logic may send the selected action and content identification information again. If the logic determines another request should not be sent, it may terminate further processing. When a response is received, the logic may perform processing on the response. For example, when the selected action includes a request to stream an advertisement video to the subscriber device, the logic may access the streaming advertisement video, store components for the streaming advertisement video, and display the video content on the subscriber device (4114).

The systems and hardware platforms described above may be implemented in many different ways. The functionality may be implemented in a single system or functionally partitioned across multiple systems. As another example, logic implemented as computer-executable instructions or as data structures in memory may be stored on, distributed across, or read from many different types of machine-readable media. The machine-readable media may include RAM, ROM, hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

Examples of protocols that the systems and hardware platforms may employ include the Real Time Messaging Protocol (RTMP) and Real Time Streaming Protocol (RTSP). The FLV (Flash Video) format may be employed for the media streams, and the systems may include Adobe (TM) Flash Media Streaming Server software, available from Adobe System Incorporated of San Jose, Calif. As other examples, the systems may include a Flash Lite (TM) server, QuickTime (TM) streaming server, or Darwin open-source server.

However, any other protocols for communicating audio, video, and data over a network between a server and an endpoint may be employed. The transport layer may include Transport Control Protocol (TCP), Real Time Transport Protocol (RTP) or other transport logic. The network layer may route information based on Internet Protocol v4, v6 (i.e., IPv4 or IPv6) or other network layer protocols. The data link layer may include wired or wireless links, such as IEEE 802.11, WiFi, WiMAX, Asynchronous Transfer Mode (ATM), Fiber Distributed Data Interface (FDDI), Ethernet, or other data link layers over optical fiber, coaxial cable, twisted pair or other physical layers.

Interfaces between the systems and the logic and modules within systems may be implemented in numerous ways. For example, interface between systems may be Web Services interfaces. Other examples of interfaces include message passing, such as publish/subscribe messaging, shared memory, and remote procedure calls.

The hardware and software platforms that run on the endpoints may vary widely. As examples, the endpoints may run the Windows CE (TM) operating system, JAVA ME (TM) system, Symbian (TM) operating system, Palm (TM) operating system. The hardware platforms may be implemented with a general purpose processing platform, such as those available from Sun Microsystems, Hewlett Packard, or International Business Machines and running Unix, Windows (TM), Linux or other operating systems.

While various embodiments of the multi-channel content modeling system have been described, it will be apparent to those of ordinary skill in the art that many more embodiments and implementations are possible within the scope of the invention. Accordingly, the invention is not to be restricted except in light of the attached claims and their equivalents.

According to another aspect, a product may comprise a memory and system core logic stored on the memory and operable to receive a content catalogue request from a subscriber, access stored subscriber profile information including subscriber segment information comprising an interest category designation, request and receive subscriber-specific catalogue information from application enabler logic, access stored service variant information including subscription identification information identifying a subscription service to which the subscriber has access, and service capability information identifying subscription actions associated with the subscription service to which the subscriber has access, create a catalogue bundle in the memory comprising the subscriber-specific catalogue information, the subscription identification information, and the service capability information, and send the catalogue bundle to the subscriber, and the application enabler logic stored on the memory and operable to store catalogue information identifying available media content, receive a request for subscriber-specific catalogue information from the system core, the request including the interest category designation, access the catalogue information associated with the interest category designation, the catalogue information associated with the interest category designation including catalogue entries matching the interest category designation, and where each catalogue entry comprises a content identifier and a content title associated with the content identifier, and send the catalogue information associated with the interest category designation to the system core.

According to yet another aspect, the system core logic may further operable to: receive the content catalogue request from the subscriber including receiving subscriber identification information identifying a system account associated with the subscriber, where the subscriber-profile information is associated with the system account, and where the subscription identification information is associated with the system account.

According to yet another aspect, the system core logic may be further operable to receive the content catalogue request including receiving channel identification information identifying a device associated with the subscriber, and where the subscriber-specific catalogue information includes catalogue entries with the channel identification information.

According to yet another aspect, the system core logic may be further operable to receive a content request from the subscriber based on the sent subscriber-specific catalogue information, where the content request includes the content identifier, retrieve a stored uniform resource locator (URL) based on the content request, retrieve a stored access parameter, where the access parameter provides access to the system through a system account, and perform access operations based on the URL and the access parameter.

What is claimed is:

1. A multi-channel content modeling service method for implementation on a service delivery platform system, the method comprising:

receiving a content catalogue request from a subscriber;

identifying a device from which the content catalogue request was received;

where the device from which the content catalogue request was received is a mobile device:

automatically identifying the subscriber based on the Mobile Subscriber Integrated Services Digital Network Number; and identifying an operating system running on the mobile device;

identifying a processing capability of the device;

retrieving subscriber profile information from a converged subscription management (CSM) module, where the subscriber profile information includes subscriber segment information comprising an interest category designation;

obtaining catalogue information customized to the subscriber and to the type of device from an Entertainment Content Management (ECM) module, comprising identifying catalogue entries customized to the interest category designation, to the device from which the content catalogue request was received, to the processing capability of the device, and, where the device from which the content catalogue request was received is a mobile device, to the operating system running on the mobile device, and where each catalogue entry comprises:

a content identifier; and a content title associated with the content identifier;

creating a catalogue bundle in memory comprising the catalogue information customized to the subscriber, to the device from which the content catalogue request was received, and to the processing capability of the device, wherein the catalogue bundle comprises information that provides a catalogue display on the device from which the content catalogue request was received, and wherein creating the catalogue bundle comprises reformatting the catalogue information into catalogue display entries tailored to the device and processing capability of the device from which the content catalogue request was received;

sending the catalogue bundle to the device from which the content catalogue request was received; and receiving an action request from the device from which the content catalogue request was received corresponding to a catalogue display entry in the catalogue bundle.

2. The method of claim 1 where receiving the content catalogue request from the subscriber includes receiving subscriber identification information identifying a service delivery platform account associated with the subscriber, where the subscriber-profile information is associated with the service delivery platform account.

3. The method of claim 1 further comprising retrieving subscription identification information identifying a digital file locker subscription service and service capability information identifying subscription actions comprising "store", "share", or "public" subscription action capabilities associated with the digital file locker subscription service, wherein the catalogue bundle further comprises the subscription identification information and the service capability information.

4. The method of claim 1 further comprising:

receiving a content request from the subscriber based on the sent catalogue information, where the content request includes the content identifier;

retrieving a uniform resource locator (URL) based on the content request;

retrieving an access parameter from the CSM module, where the access parameter provides access to the service delivery platform system; and performing access operations based on the URL and the access parameter.

5. The method of claim 4 where retrieving a URL includes retrieving a URL related to a download or streaming server.

6. The method of claim 4 where performing access operations includes:

accessing content associated with the URL using the access parameter; and uploading the content associated with the URL to a User Service Platform.

7. The method of claim 6 where uploading the content to a User Service Platform includes uploading the content to a digital file locker.

8. The method of claim 6 where uploading the content to a User Service Platform includes uploading the content to a Web 2.0 repository.

9. The method of claim 6 where uploading the content to a User Service Platform includes uploading the content to a shared directory.

10. The method of claim 4 where performing access operations includes:

accessing content associated with the URL using the access parameter; and delivering the content associated with the URL to the subscriber.

11. The method of claim 4 where receiving the content request includes receiving a content request comprising a selected subscription service, a selected subscription action identifier associated with a selected subscription service, and subscription access identification information identifying a subscription account associated with the selected subscription service, where the access parameter is retrieved based on the subscription access identification information and the selected subscription service, and where performing access operations includes:

accessing content associated with the URL using the access parameter; and performing a selected subscription action associated with the selected subscription action identifier on the accessed content.

12. A multi-channel content modeling service system comprising:

a system core embodied on a non-transitory computer readable medium operable to:

receive a content catalogue request from a subscriber;

identify a device from which the content catalogue request was received;

where the identified device from which the content catalogue request was received is a mobile device:

automatically identify the subscriber based on the Mobile Subscriber Integrated Services Digital Network Number; and identify an operating system running on the mobile device;

identify a processing capability of the identified device;

access stored subscriber profile information including subscriber segment information comprising an interest category designation;

request and receive catalogue information customized to the subscriber and to the device from an application enabler;

access stored service variant information including:

subscription identification information identifying a subscription service to which the subscriber has access; and service capability information identifying subscription actions associated with the subscription service to which the subscriber has access;

create a catalogue bundle in memory comprising the catalogue information, the subscription identification information, and the service capability information, wherein the catalogue bundle comprises information that provides a catalogue display on the device from which the content catalogue request was received, and wherein creating the catalogue bundle comprises reformatting the catalogue information into catalogue display entries tailored to the device from which the content catalogue request was received and to the processing capability of the identified device from which the content catalogue request was received;

send the catalogue bundle to the subscriber;

receive an action request from the identified device corresponding to a catalogue display entry in the catalogue bundle; and the application enabler operable to:

store catalogue information identifying available media content;

receive a request for catalogue information from the system core, the request including the interest category designation;

identify catalogue information customized to the interest category designation, to the identified device, to the processing capability of the identified device, and, where the identified device from which the content catalogue request was received is a mobile device, to the operating system running on the mobile device, the catalogue information including:

catalogue entries, and where each catalogue entry comprises:

a content identifier; and a content title associated with the content identifier; and send the catalogue information customized to the interest category designation, the identified device, and the processing capability to the system core.

13. The system of claim 12 where the system core is further operable to: receive the content catalogue request from the subscriber including receiving subscriber identification information identifying a system account associated with the subscriber, where the subscriber-profile information is associated with the system account, and where the subscription identification information is associated with the system account.

14. The system of claim 12 where the system core is further operable to:

receive a content request from the subscriber based on the sent catalogue information, where the content request includes the content identifier;

retrieve a stored uniform resource locator (URL) based on the content request;

retrieve a stored access parameter, where the access parameter provides access to the system through a system account; and perform access operations based on the URL and the access parameter.

15. A product comprising:

a memory;

system core logic stored on the memory and operable to:

receive a content catalogue request from a subscriber;

identify a device from which the content catalogue request was received;

where the identified device from which the content catalogue request was received is a mobile device:

automatically identify the subscriber based on the Mobile Subscriber Integrated Services Digital Network Number; and identify an operating system running on the mobile device;

identify a processing capability of the identified device;

access stored subscriber profile information including subscriber segment information comprising an interest category designation;

request and receive subscriber-specific catalogue information customized to the device and to the subscriber from application enabler logic;

access stored service variant information including:

subscription identification information identifying a subscription service to which the subscriber has access; and service capability information identifying subscription actions associated with the subscription service to which the subscriber has access;

create a catalogue bundle in the memory comprising the catalogue information customized to the subscriber and to the device, the subscription identification information, and the service capability information, wherein the catalogue bundle comprises information that provides a catalogue display on the device from which the content catalogue request was received, and wherein creating the catalogue bundle comprises reformatting the catalogue information into catalogue display entries tailored to the device from which the content catalogue request was received and to the processing capability of the identified device from which the content catalogue request was received; and send the catalogue bundle to the subscriber;

receive an action request from the identified device corresponding to a catalogue display entry in the catalogue bundle; and the application enabler logic stored on the memory and operable to:

store catalogue information identifying available media content;

receive a request for catalogue information from the system core, the request including the interest category designation;

identify catalogue information customized to the interest category designation, to the identified device, to the processing capability of the identified device, and, where the identified device from which the content catalogue request was received is a mobile device, to the operating system running on the mobile device, the catalogue information including:

catalogue entries, and where each catalogue entry comprises:

a content identifier; and a content title tailored to the content identifier; and send the catalogue information associated with the interest category designation, the identified device, and the processing capability to the system core.

16. The product of claim 15 where the system core logic is further operable to:

receive the content catalogue request from the subscriber including receiving subscriber identification information identifying a system account associated with the subscriber, where the subscriber-profile information is associated with the system account, and where the subscription identification information is associated with the system account.

17. The product of claim 15 where the system core logic is further operable to:

receive a content request from the subscriber based on the sent catalogue information, where the content request includes the content identifier;

retrieve a stored uniform resource locator (URL) based on the content request;

retrieve a stored access parameter, where the access parameter provides access to the system through a system account; and perform access operations based on the URL and the access parameter.

* * * * *